US012261665B2

(12) United States Patent
Ly et al.

(10) Patent No.: US 12,261,665 B2
(45) Date of Patent: Mar. 25, 2025

(54) TECHNIQUES FOR REPORTING CHANNEL QUALITY FOR DYNAMIC ANTENNA PORT ADAPTATION

(71) Applicant: QUALCOMM Incorporated, San Diego, CA (US)

(72) Inventors: Hung Dinh Ly, San Diego, CA (US); Yu Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/860,340

(22) Filed: Jul. 8, 2022

(65) Prior Publication Data

US 2024/0014869 A1 Jan. 11, 2024

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0632* (2013.01)

(58) Field of Classification Search
CPC ... H04B 7/0626; H04B 7/0456; H04B 7/0632
USPC ........................................................ 370/329
See application file for complete search history.

(56) References Cited

U.S. PATENT DOCUMENTS

| 9,059,753 B2 * | 6/2015 | Yang | H04B 7/0691 |
| 2015/0304010 A1 * | 10/2015 | Zhang | H04L 5/005 |
| | | | 370/329 |
| 2019/0007112 A1 * | 1/2019 | Faxér | H04B 7/0626 |
| 2019/0068256 A1 * | 2/2019 | Muruganathan | H04B 7/0479 |
| 2021/0226674 A1 * | 7/2021 | Ramireddy | H04B 7/0626 |
| 2024/0322888 A1 * | 9/2024 | Chen | H04L 27/34 |

FOREIGN PATENT DOCUMENTS

KR 102275239 B1 7/2021
WO WO-2019137445 A1 7/2019

OTHER PUBLICATIONS

International Search Report and Written Opinion—PCT/US2023/068180—ISA/EPO—Sep. 15, 2023.

(Continued)

*Primary Examiner* — Anthony Mejia
(74) *Attorney, Agent, or Firm* — Dalei Dong; Holland & Hart LLP

(57) ABSTRACT

Methods, systems, and devices for wireless communications are described that provide for indication of channel state information (CSI) for multiple CSI codebooks associated with multiple different sets of antenna ports, where CSI parameters for one or more of the codebooks are reported as differential values relative to reported values of another of the codebooks. A user equipment (UE) may receive a CSI report configuration that includes a set of CSI resources and multiple codebooks for multiple different sets of antenna ports. The UE may identify a first set of CSI parameters associated with a first codebook, and may identify a second set of CSI parameters associated with a second codebook. The UE may transmit a CSI report that includes the first set of CSI parameters and a set of differential CSI parameters that indicate a difference between the first and second sets of CSI parameters.

30 Claims, 20 Drawing Sheets

(56) References Cited

OTHER PUBLICATIONS

Moderator (Huawei): "FL summary#1 for SD and PD adaptation for R18 NES", 3GPP TSG-RAN WGI Meeting #113, R1-2306030, 3rd Generation Partnership Project, Mobile Competence Centre, 650, Route Des Lucioles, F-06921 Sophia-Antipolis Cedex, France, vol. 3GPP RAN 1, No. Incheon, KR, May 22, 2023-May 26, 2023, May 23, 2023, 53 Pages, XP052378063, p. 26/53.

* cited by examiner

TECHNIQUES FOR REPORTING CHANNEL QUALITY FOR DYNAMIC ANTENNA PORT ADAPTATION

FIELD OF TECHNOLOGY

The following relates to wireless communications, including techniques for reporting channel quality for dynamic antenna port adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, some network entities, such as radio units (RUs) or radio heads, may communicate using multiple antenna panels or subpanels that may facilitate multiple-input multiple-output (MIMO) communications. In some cases, different subsets of the multiple antenna panels of subpanels may be active at different times. Efficient communications in cases where differing quantities of antennas are active may help to enhance the reliability and efficiency of wireless communications between network entities and UEs.

SUMMARY

The described techniques relate to improved methods, systems, devices, and apparatuses that support techniques for reporting channel quality for dynamic antenna port adaptation. For example, the described techniques provide for indication of channel state information (CSI) for multiple CSI codebooks associated with multiple different sets of antenna ports, where CSI parameters for one or more of the codebooks are reported as differential values relative to reported values of another of the codebooks. In some cases, a user equipment (UE) may receive a CSI report configuration that includes a set of CSI resources and multiple codebooks for multiple different sets of antenna ports associated with the set of CSI resources. The UE may identify a first set of CSI parameters associated with a first codebook, and may identify a second set of CSI parameters associated with a second codebook. The UE may transmit a CSI report that includes the first set of CSI parameters and a third set of differential CSI parameters that indicate a difference between corresponding CSI parameters of the second set of CSI parameters and the first set of CSI parameters.

A method for wireless communication at a user equipment (UE) is described. The method may include receiving a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, identifying a first set of channel state information parameters associated with the first codebook, identifying a second set of channel state information parameters associated with the second codebook, and transmitting a channel state information report that includes the first set of channel state information parameters and a third set of differential channel state information parameters, where the third set of differential channel state information parameters indicate a difference between corresponding channel state information parameters of the second set of channel state information parameters and the first set of channel state information parameters.

An apparatus for wireless communication at a UE is described. The apparatus may include a processor, memory coupled with the processor, and instructions stored in the memory. The instructions may be executable by the processor to cause the apparatus to receive a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, identify a first set of channel state information parameters associated with the first codebook, identify a second set of channel state information parameters associated with the second codebook, and transmit a channel state information report that includes the first set of channel state information parameters and a third set of differential channel state information parameters, where the third set of differential channel state information parameters indicate a difference between corresponding channel state information parameters of the second set of channel state information parameters and the first set of channel state information parameters.

Another apparatus for wireless communication at a UE is described. The apparatus may include means for receiving a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, means for identifying a first set of channel state information parameters associated with the first codebook, means for identifying a second set of channel state information parameters associated with the second codebook, and means for transmitting a channel state information report that includes the first set of channel state information parameters and a third set of differential channel state information parameters, where the third set of differential channel state information parameters indicate a difference between corresponding channel state information parameters of the second set of channel state information parameters and the first set of channel state information parameters.

A non-transitory computer-readable medium storing code for wireless communication at a UE is described. The code may include instructions executable by a processor to receive a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, identify a first set of channel state information parameters associated with the first codebook, identify a second set of channel state information parameters associated with the second codebook, and transmit a channel state information report that includes the first set of channel state information parameters and a third set of differential channel state information parameters, where the third set of differential channel state information parameters indicate a difference between corresponding channel state information parameters of the second set of channel state information parameters and the first set of channel state information parameters.

Some examples of the method, apparatuses, and non-transitory computer-readable medium described herein may further include operations, features, means, or instructions for determining the third set of differential channel state information parameters based on an offset level between index values of a second channel quality indicator (CQI) of the second codebook and a first CQI of the first codebook. In some examples of the method, apparatuses, and non-transitory computer-readable medium described herein, the offset level indicates a range of a set of ranges of differences between the second CQI and the first CQI. In some examples of the method, apparatuses, and non-transitory computer-readable medium described herein, the index values of the first CQI and the second CQI indicate CQI values.

Some examples of the method, apparatuses, and non-transitory computer-readable medium described herein may further include operations, features, means, or instructions for selecting the first codebook from the set of multiple codebooks based on a quantity of antenna ports associated with each codebook of the set of multiple codebooks. Some examples of the method, apparatuses, and non-transitory computer-readable medium described herein may further include operations, features, means, or instructions for selecting the first codebook from the set of multiple codebooks based on a quantity of columns of antenna ports or a quantity of rows of antenna ports associated with each codebook of the set of multiple codebooks. Some examples of the method, apparatuses, and non-transitory computer-readable medium described herein may further include operations, features, means, or instructions for selecting the first codebook from the set of multiple codebooks based on an index value associated with a list of the multiple sets of antenna ports associated with the set of channel state information resources.

In some examples of the method, apparatuses, and non-transitory computer-readable medium described herein, the first codebook corresponds to a base codebook associated with the set of channel state information resources, that may be indicated in the channel state information report configuration. In some examples of the method, apparatuses, and non-transitory computer-readable medium described herein, the channel state information report includes an indication of an index value associated with the first codebook. In some examples of the method, apparatuses, and non-transitory computer-readable medium described herein, the channel state information report configuration further includes an identification of which of the set of multiple codebooks corresponds to the first codebook.

In some examples of the method, apparatuses, and non-transitory computer-readable medium described herein, the first set of channel state information parameters includes a first CQI associated with a first downlink channel codeword and a second CQI associated with a second downlink channel codeword, and where the third set of differential channel state information parameters indicate the difference between a third CQI associated with the second set of channel state information parameters and one of the first CQI or the second CQI. In some examples of the method, apparatuses, and non-transitory computer-readable medium described herein, the third set of differential channel state information parameters indicate the difference between the third CQI and the first CQI, and where the second CQI may be reported as a differential value from the first CQI.

A method for wireless communication at a network entity is described. The method may include transmitting, to a UE, a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, transmitting one or more reference signals via the set of channel state information resources, and receiving, from the UE, a channel state information report based on the one or more reference signals, the channel state information report including a first set of channel state information parameters associated with the first codebook, and a third set of differential channel state information parameters associated with the second codebook, where the third set of differential channel state information parameters indicate a difference between corresponding channel state information parameters of a second set of channel state information parameters and the first set of channel state information parameters.

An apparatus for wireless communication at a network entity is described. The apparatus may include a processor, memory coupled with the processor, and instructions stored in the memory. The instructions may be executable by the processor to cause the apparatus to transmit, to a UE, a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, transmit one or more reference signals via the set of channel state information resources, and receive, from the UE, a channel state information report based on the one or more reference signals, the channel state information report including a first set of channel state information parameters associated with the first codebook, and a third set of differential channel state information parameters associated with the second codebook, where the third set of differential channel state information parameters indicate a difference between corresponding channel state information parameters of a second set of channel state information parameters and the first set of channel state information parameters.

Another apparatus for wireless communication at a network entity is described. The apparatus may include means for transmitting, to a UE, a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, means for transmitting one or more reference signals via the set of channel state information resources, and means for receiving, from the UE, a channel state information report based on the one or more reference signals, the channel state information report including a first set of channel state information parameters associated with the first codebook, and a third set of differential channel state information parameters associated with the second codebook, where the third set of differential channel state information parameters indicate a difference between corresponding channel state information parameters of a second set of channel state information parameters and the first set of channel state information parameters.

A non-transitory computer-readable medium storing code for wireless communication at a network entity is described. The code may include instructions executable by a processor to transmit, to a UE, a channel state information report configuration that includes a set of channel state information resources and a set of multiple codebooks for a set of multiple sets of antenna ports associated with the set of channel state information resources, where the set of multiple codebooks include at least a first codebook for a first set of antenna ports and a second codebook for a second set of antenna ports that is different than the first set of antenna ports, transmit one or more reference signals via the set of channel state information resources, and receive, from the UE, a channel state information report based on the one or more reference signals, the channel state information report including a first set of channel state information parameters associated with the first codebook, and a third set of differential channel state information parameters associated with the second codebook, where the third set of differential channel state information parameters indicate a difference between corresponding channel state information parameters of a second set of channel state information parameters and the first set of channel state information parameters.

Some examples of the method, apparatuses, and non-transitory computer-readable medium described herein may further include operations, features, means, or instructions for determining the second set of channel state information parameters based on an offset level between index values of a second CQI of the second codebook and a first CQI of the first codebook that may be provided in the third set of differential channel state information parameters. In some examples of the method, apparatuses, and non-transitory computer-readable medium described herein, the offset level indicates a range of a set of ranges of differences between the second CQI and the first CQI. In some examples of the method, apparatuses, and non-transitory computer-readable medium described herein, the index values of the first CQI and the second CQI indicate CQI values.

Some examples of the method, apparatuses, and non-transitory computer-readable medium described herein may further include operations, features, means, or instructions for selecting the first codebook from the set of multiple codebooks based on a quantity of antenna ports associated with each codebook of the set of multiple codebooks. Some examples of the method, apparatuses, and non-transitory computer-readable medium described herein may further include operations, features, means, or instructions for selecting the first codebook from the set of multiple codebooks based on a quantity of columns of antenna ports or a quantity of rows of antenna ports associated with each codebook of the set of multiple codebooks. Some examples of the method, apparatuses, and non-transitory computer-readable medium described herein may further include operations, features, means, or instructions for selecting the first codebook from the set of multiple codebooks based on an index value associated with a list of the multiple sets of antenna ports associated with the set of channel state information resources.

In some examples of the method, apparatuses, and non-transitory computer-readable medium described herein, the first codebook corresponds to a base codebook associated with the set of channel state information resources, that is indicated in the channel state information report configuration. In some examples of the method, apparatuses, and non-transitory computer-readable medium described herein, the channel state information report includes an indication of an index value associated with the first codebook. In some examples of the method, apparatuses, and non-transitory computer-readable medium described herein, the channel state information report configuration further includes an identification of which of the multiple codebooks corresponds to the first codebook.

In some examples of the method, apparatuses, and non-transitory computer-readable medium described herein, the first set of channel state information parameters includes a first CQI associated with a first downlink channel codeword and a second CQI associated with a second downlink channel codeword, and where the third set of differential channel state information parameters indicate the difference between a third CQI associated with the second set of channel state information parameters and one of the first CQI or the second CQI. In some examples of the method, apparatuses, and non-transitory computer-readable medium described herein, the third set of differential channel state information parameters indicate the difference between the third CQI and the first CQI, and where the second CQI may be reported as a differential value from the first CQI.

DETAILED DESCRIPTION

Figure 1:
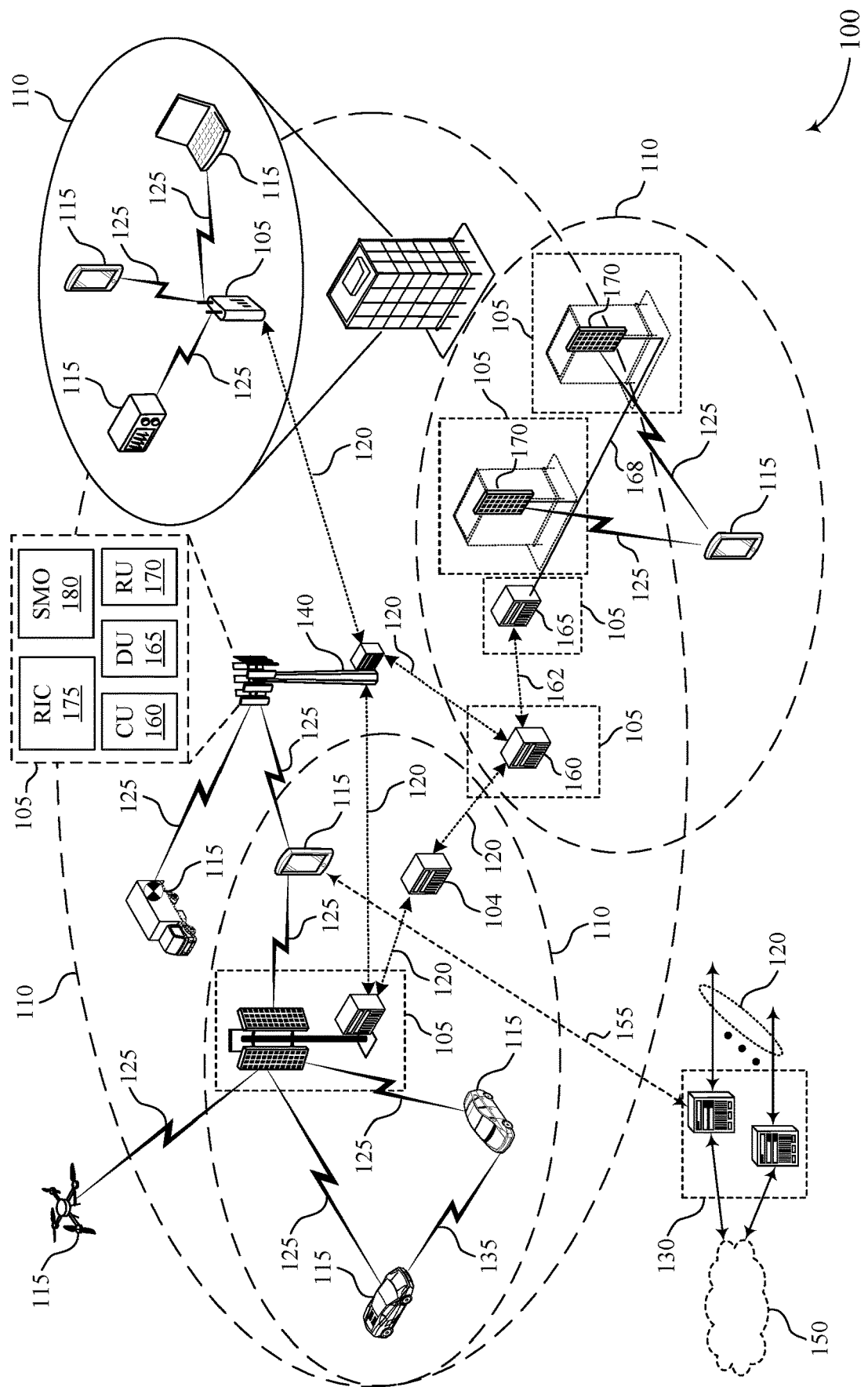
FIG. 1 illustrates an example of a wireless communications system that supports techniques for reporting channel quality for dynamic antenna port adaptation in accordance with one or more aspects of the present disclosure.

In some wireless communications systems, such as fifth generation (5G) systems, beamformed communications may be used in which multiple directional beams are used for communications in multiple directions from a network entity, such as a radio unit (RU) or a radio head. In order to support such directional beamforming, such network entities may use multiple different antenna panel, antenna subpanels, or both, where different combinations of antenna ports may be used to form beams in desired directions. In some cases, to help reduce power consumption, some antenna panels, or antenna subpanels, may be inactive for certain periods of time. For example, based on an amount of data traffic and a number of devices being served, a network entity may disable one or more antenna panels and use a subset of available antenna panels, or subpanels, for communications. Such techniques may be referred to as dynamic antenna port adaptation, where a network entity may dynamically adjust a number of antennas used for communications.

In order to properly adjust transmission parameters when different antennas are used for consecutive communications with a user equipment (UE), the network entity may use a channel state information (CSI) report associated with two or more potential sets of antenna ports. Based on the CSI report for the different sets of antenna ports, communications using the different sets of antennas may be properly adjusted to provide reliable communications. However, transmitting separate CSI reports for multiple different possible combinations of antenna ports can consume a relatively large amount of overhead and consume UE power. Thus, techniques to efficiently report CSI for different available combinations of antenna ports would be beneficial to reduce overhead usage of wireless resources as well as reduce UE power relative to transmission of full CSI reports for each reported set of antenna ports.

In accordance with various aspects discussed herein, differential CSI reporting techniques are provided that allow a UE to provide a CSI report with a first set of CSI parameters (e.g., channel quality information (CQI) parameters) for a first codebook for set of antenna ports of a set of CSI resources, and a second set of differential CSI parameters for a second codebook for a second set of antenna ports of the set of CSI resources. The differential CSI parameters may be provided for different sets of antenna ports for different CSI codebooks for reporting wideband CSI. In some cases, the UE may report CQI for the first codebook, and report differential CQIs for each of the other codebooks. In some cases, the differential CQI may be determined as a difference between a CQI index of each of the other codebooks and the CQI index of the first codebook, and the difference value may be mapped to an offset level range. The offset level range for each differential CQI may be reported, thus substantially reducing an amount of data of the differential CSI report relative to a CSI report that would contain complete CSI parameters.

In some cases, the first codebook of the set of configured codebooks for a set of CSI resources may be selected as a codebook with the largest (or smallest) number of antenna ports, a codebook with largest/smallest N1 or N2 values, a codebook with a largest/smallest index value of a list of configured codebooks, or a base codebook associated with the set of CSI resources. In some cases, the first codebook may be explicitly indicated by the UE with the CSI report (e.g., as an index value of configured codebooks), or a network entity may indicate which codebook is to be used at the first codebook. In cases where a codebook has a CSI rank of higher than four, a first CQI may be associated with a first downlink channel codeword and a second CQI may be associated with a second downlink channel codeword, and the reference CQI for differential reporting may be the first CQI or the second CQI.

Aspects of the disclosure are initially described in the context of wireless communications systems. Aspects of the disclosure are further illustrated by and described with reference to CSI report configurations, process flows, apparatus diagrams, system diagrams, and flowcharts that relate to techniques for reporting channel quality for dynamic antenna port adaptation.

FIG. 1 illustrates an example of a wireless communications system 100 that supports techniques for reporting channel quality for dynamic antenna port adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for reporting channel quality for dynamic antenna port adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, one or more UEs 115 may be provided with CSI report configurations for reporting CSI to a network entity 105. Various CSI report configurations may include multiple CSI codebooks associated with multiple different sets of antenna ports. In some cases, UEs 115 may report CSI parameters for one or more of the codebooks as differential values relative to reported values of another of the codebooks. In some cases, a UE 115 may identify a first set of CSI parameters associated with a first codebook, and may identify a second set of CSI parameters associated with a second codebook. The UE 115 may transmit a CSI report that includes the first set of CSI parameters and a third set of differential CSI parameters that indicate a difference between corresponding CSI parameters of the second set of CSI parameters and the first set of CSI parameters.

Figure 2:
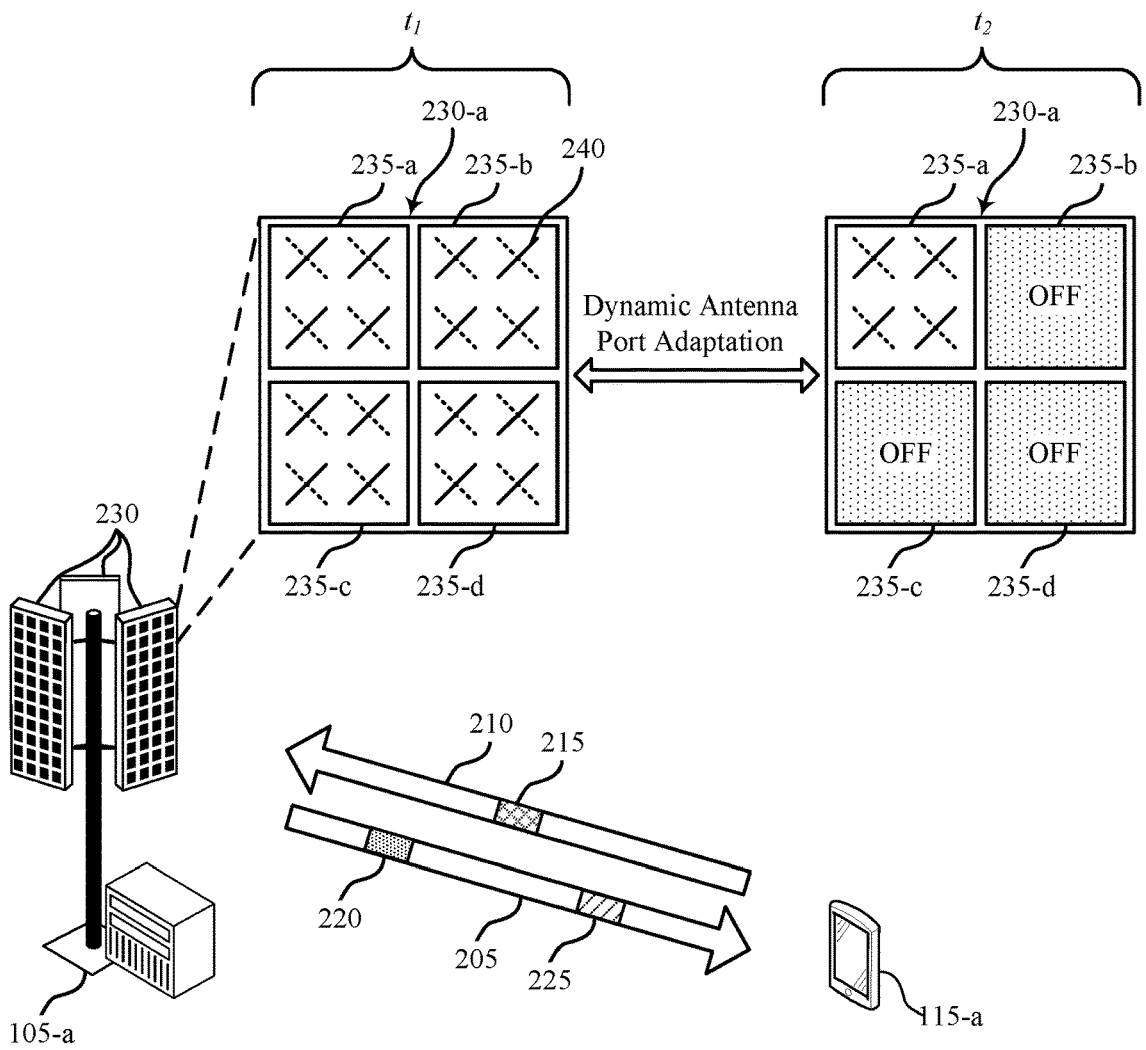
FIG. 2 illustrates an example of a wireless communications system that supports techniques for reporting channel quality for dynamic antenna port adaptation in accordance with one or more aspects of the present disclosure.

FIG. 2 illustrates an example of a wireless communications system 200 that supports techniques for reporting channel quality for dynamic antenna port adaptation in accordance with one or more aspects of the present disclosure. As illustrated, wireless communications system 200 may include UE 115-a and network entity 105-a, which may be examples of a UE 115 or a network entity 105, as described above with reference to FIG. 1. Wireless communications system 200 may also include downlink 205 and uplink 210. Network entity 105-a may use downlink 205 to convey control and/or data information to UE 115-a. And UE 115-a may use uplink 210 to convey control and/or data information to the network entity 105-a. In some cases, downlink 205 may use different time and/or frequency resources than uplink 210.

In some cases, the network entity 105-a may use multiple antenna panels 230 for communications with various served UEs 115, and in some cases one or more of the antenna panels 230 may have multiple antenna sub-panels 235. In some cases, the network entity 105-a may turn off some antenna panels 230 or sub-panels 235 (e.g., for power reduction), and communications are conducted using a subset of antenna panels 230 and sub-panels 235 that remain on. For example, some MIMO communications (e.g., massive-MIMO) utilize multiple co-located antenna panels 230 or sub-panels 235 that include multiple antenna ports. Each panel may be equipped with relatively large number of power amplifiers (PAs), and thus when all antennas are enabled the antenna subsystem may consume relatively large amounts of power. Through dynamic antenna port adaptation, the network entity 105-a may dynamically determine to turn off one or more antenna panels 230, one or more antenna sub-panels 235, or one or more antenna ports 240 for energy efficiency if a traffic load is relatively low. In the example of FIG. 2, a first antenna panel 230-a may have multiple antenna sub-panels 235, including a first antenna sub-panel 235-a, a second antenna sub-panel 235-b, a third antenna sub-panel 235-c, and a fourth antenna sub-panel 235-d. In this example, at a first time period ($t_1$), each of the antenna sub-panels 235-a through 235-d may be turned on and actively transmit or receive communications, and at a second time period ($t_2$), only the first antenna sub-panel 235-a may be active, with each of the second antenna sub-panel 235-b, the third antenna sub-panel 235-c, and the fourth antenna sub-panel 235-d may be turned off.

In order to provide reliable communications for communications in each of the first time period ($t_1$) and the second time period ($t_2$), the network entity 105-a may indicate to the UE 115-a appropriate parameters for communications using the different sets of antenna ports 240 that are active in the different time periods. The communications parameters may be determined based on one or more CSI reports 215 provided by the UE 115-a, that include measurements of one or more CSI reference signals (CSI-RSs) 220 according to a CSI report configuration 225. In some cases, the CSI report configuration 225 may indicate N codebook configurations, where each codebook configuration provides CSI for different combinations of antenna ports 240. In some cases, the UE 115-a may be configured to provide X≤N CSIs in a single CSI report 215. Examples of CSI report configurations 225 are discussed in more detail with reference to FIGS. 3 through 5.

In accordance with various techniques discussed herein, in cases where two or more CSIs are to be provided in a one CSI report 215 (e.g., X>1), one or more of the CSIs may be provided as a differential CSI report to reduce reporting overhead. In some cases, CQI that is reported in a CSI report 215 may be a differential CQI provided in the CSI report 215 associated a CSI report configuration 225 having multiple codebook configurations. In some cases, the UE 115-a may report a reference CQI for a reference codebook in a first part of the CSI report 215 (e.g., in CSI part 1 of CSI report 215), and the UE 115-a may report supplemental differential CQIs associated with other codebooks in a second part of the CSI report 215 (e.g., in CSI part 2). In some cases, the differential CQI for a codebook may be defined based on an offset from the reference CQI (e.g., offset level (c)=supplemental CQI index (c)−reference CQI index). In some cases, the offset level may be mapped into different offset level ranges. In accordance with various aspects, both the supplemental CQI index and the reference CQI index are wideband CQI indices (e.g., that span a configured bandwidth part (BWP), where the BWP may include two or more subbands).

In some cases, the reference codebook that is used to determine differential CQI values may be a configured codebook or determined based on one or more factors. In some cases, the reference codebook may be a codebook from the CSI configuration 225 with the largest, or smallest, number of antenna ports (e.g., computed by 2*N1*N2, where N1 is a quantity of columns of antenna ports and N2 is a quantity of rows of antenna ports). In such cases, if two codebooks have a same number of antenna ports, the reference codebook may correspond to a codebook with larger, or smaller, N1 value; or may correspond to a codebook with a larger, or smaller, N2 value. Additionally, or alternatively, if two codebooks have a same number of antenna ports, the reference codebook may be selected based on an order in the list of antenna port configurations in the CSI report configuration 225 (e.g., the first, or last, codebook with the largest number of antenna ports). In some cases, the reference codebook may be a codebook associated with a resource in a CSI resource set (e.g., a base codebook). In some cases, the reference codebook may be selected by the UE 115-a, and may be reported to the network entity 105-a (e.g., as an index value that indicates the reference codebook). For example, the UE 115-a may select the reference codebook based on a spectral efficiency, CQI, rank, or any combinations thereof, and report an index value of the selected codebook (e.g., with the CSI report 215 or in separate signaling such as RRC signaling or a medium access control (MAC) control element). In some cases, the network entity 105-a may select the reference codebook and provide an indication to the UE 115-a of a reference codebook index (e.g., in CSI report configuration 225 or in separate signaling such as RRC signaling or a MAC-CE).

In some cases, a rank of the UE 115-a may be higher than four (e.g., a rank of 5, 6, 7, 8) and a downlink channel may have two codewords. In such cases, the UE 115-a may report two CQIs, one for each codeword (2-codeword cases). In such two-codeword cases, the reference codebook for differential CQI reporting may be the CQI associated with the first codeword (e.g., reported in CSI part 1). In some cases, the CQI for the second codeword of the reference codebook may be reported using the codebook differential CQI. In some cases, for a reference codebook with rank higher than 4, the reference codebook CQI for differential CQI is the CQI associated with either the first or the second codeword. In some cases, when relatively few antenna ports are present, using the first CQI as the reference may result in a differential of more than two, or negative-one or less (≤−1). In such cases, the UE 115-a may select whether the first or second CQI is used as the reference CQI for each codebook configuration, and the selection may be indicated to the network entity 105-a (e.g., as part of CSI part 1).

Figure 3:
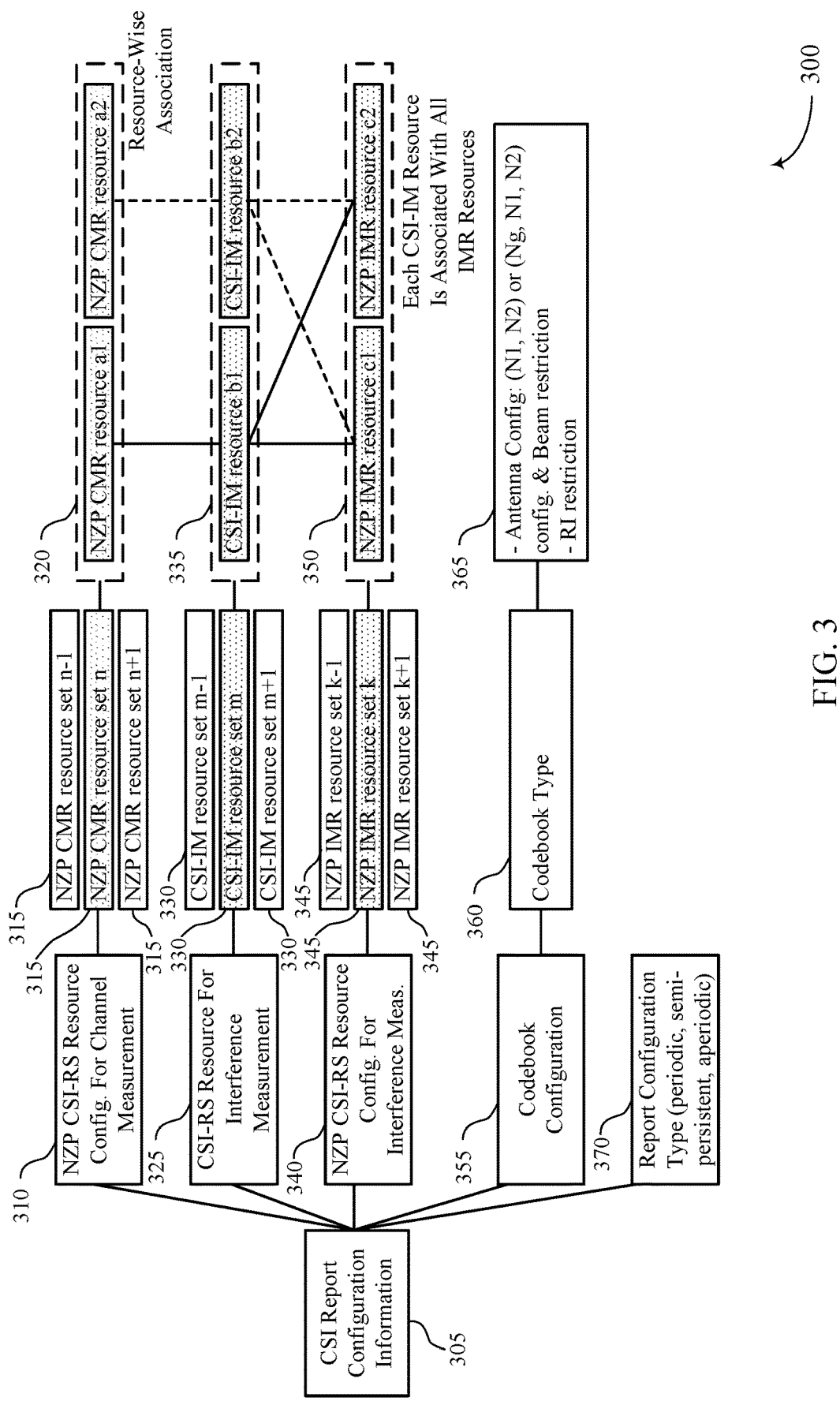
FIG. 3 illustrates an example of a CSI report configuration that supports techniques for reporting channel quality for dynamic antenna port adaptation in accordance with one or more aspects of the present disclosure.

FIG. 3 illustrates an example of a CSI report configuration 300 that supports techniques for reporting channel quality for dynamic antenna port adaptation in accordance with one or more aspects of the present disclosure. FIG. 3 may be an example of a CSI report configuration such as discussed with reference to FIGS. 1 and 2. For example, FIG. 3 illustrates a CSI report configuration 300 that may support differential reporting techniques as discussed herein.

In this example, a network entity (e.g., a network entity 105) may provide CSI report configuration information 305 to a device (e.g., a UE 115) that is to measure one or more CSI-RSs and provide one or more CSI reports based on such measurements. In this example, the CSI report configuration information 305 may provide a non-zero-power (NZP) CSI-RS resource configuration for channel measurement 310, which may include one or more NZP channel measurement resource (CMR) sets 315 with one or more NZP-CMR resources 320. The CSI report configuration information 305 also may provide a CSI-RS resource configuration for interference measurement (IM) 325, which may include one or more CSI-IM resource sets 330 with associated CSI-IM resources 335 that have a resource-wise association with NZP CMR resources 320. The CSI report configuration information 305 also may provide a NZP CSI-RS resource configuration for interference measurement 340, which may include one or more NZP IM resource sets 345 with associated NZP IM resources 350 (e.g., where each CSI-IM resource 335 is associated with all NZP IM resources 350.

The CSI report configuration information 305 also provides a codebook configuration 355, that may include a codebook type 360. Further, for each codebook type 360, an antenna configuration (e.g., N1, N2; or Ng, N1, N2) and beam restriction, and rank indicator (RI) restriction 365. The CSI report configuration information 305 may also provide a report configuration type 370, such as a periodic CSI report, semi-persistent CSI report, or aperiodic CSI report.

The CSI report configuration information 305 may be RRC configured per BWP. As discussed, the CSI report configuration 300 may include a number of different resource sets, where a resource set has Ks resources with the same number of CSI-RS ports. In some cases, for Ks=1, each resource contains at most 32 CSI-RS ports; for Ks=2, each resource contains at most 16 CSI-RS ports; and for 2<Ks≤8, each resource contains at most 8 CSI-RS ports. As discussed herein, in some cases multiple codebooks may be configured for a CSI report, with different codebooks having different antenna configurations, for example, which may support dynamic antenna adaptation. For example, a network entity may receive a CSI report and determine one or more communication parameters (e.g., modulation and coding scheme, transmit power, etc.) based on the CSI report for the codebook associated with a currently active set of antenna ports. In accordance with various aspects as discussed herein, the CSI report for one or more codebooks may be provided that includes one or more CSI parameters (e.g., CQI) for a first codebook, and one or more differential parameters for a second codebook that indicate a difference between the CSI parameters for the first codebook and CSI parameters for the second codebook.

Figure 4:
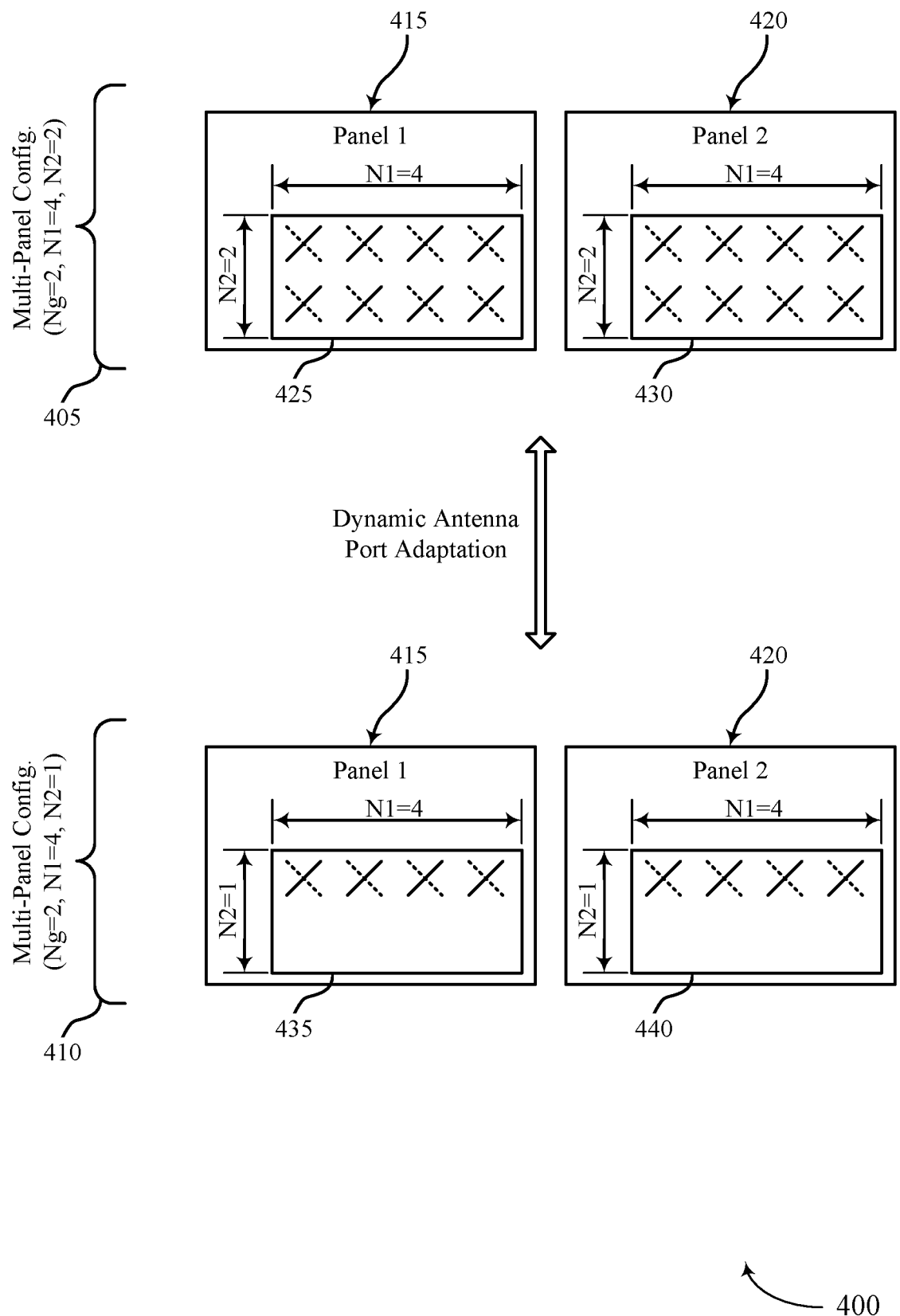
FIG. 4 illustrates examples of antenna panel configurations that support techniques for reporting channel quality for dynamic antenna port adaptation in accordance with one or more aspects of the present disclosure.

FIG. 4 illustrates example of antenna panel configurations 400 that support techniques for reporting channel quality for dynamic antenna port adaptation in accordance with one or more aspects of the present disclosure. FIG. 4 may be an example of different antenna panel configurations for which CSI parameters may be reported as discussed with reference to FIGS. 1 through 3.

In this example, a network entity (e.g., a network entity 105) may switch between a first multi-panel configuration 405 and a second multi-panel configuration 410 using dynamic antenna port adaptation techniques. The first multi-panel configuration 405 in this example, includes a first antenna panel 415 and a second antenna panel 420 (e.g., which may be separate physical panels or may be sub-panels of a larger antenna panel). In this example, in the first multi-panel configuration 405, the first antenna panel 415 may have a first set of active antenna ports 425, and the second antenna panel 420 may have a second set of active antenna ports 430. Thus, first multi-panel configuration 405 may have Ng=2 (i.e., number of active antenna panels), N1=4 (i.e., four columns of antenna ports), and N2=2 (i.e., two rows of antenna ports). The second multi-panel configuration 410 may provide the first antenna panel 415 may have a third set of active antenna ports 435 in which one of the rows of antenna elements are not used, and the second antenna panel 420 may have a fourth set of active antenna ports 440 in which one of the rows of antenna elements are not used. Thus, second multi-panel configuration 410 may have Ng=2, N1=4, and N2=1 (i.e., one row of antenna ports). A network entity may provide a CSI report configuration with codebooks that support such different antenna elements configurations (e.g., for different Ng, N1, N2 values) and corresponding number of CSI-RS antenna ports may be configured per resource (e.g., 2·Ng·N1·N2 for cross-polarized antenna elements). A UE may measure associated CSI-RSs based on the CSI report configuration and provide CSI parameters, where CSI parameters for one or more of the codebooks are reported as differential values from corresponding values of a first codebook (e.g., a reference codebook).

Figure 5:
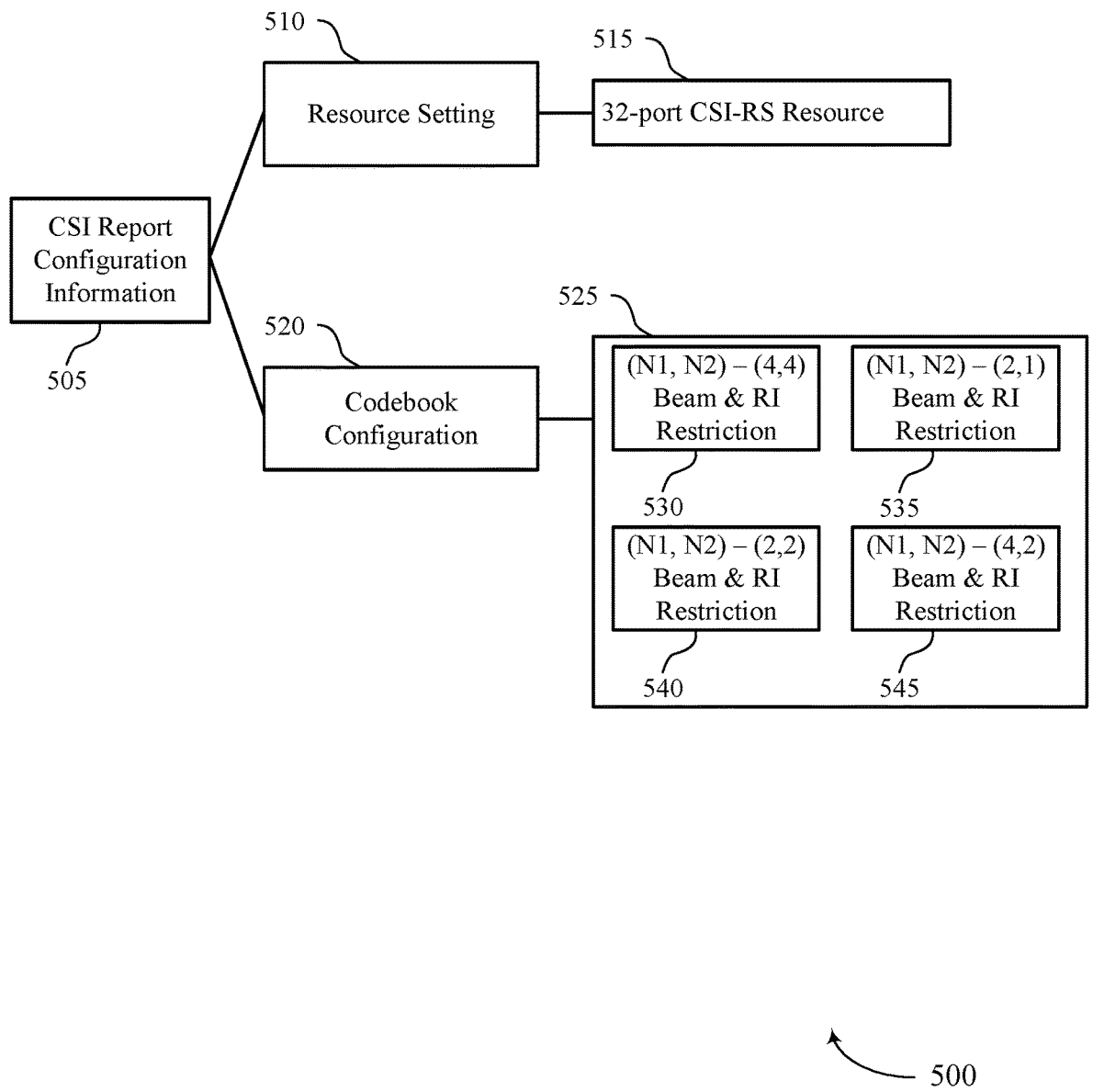
FIG. 5 illustrates an example of a CSI framework for dynamic antenna port adaptation that supports techniques for reporting channel quality for dynamic antenna port adaptation in accordance with one or more aspects of the present disclosure.

FIG. 5 illustrates an example of a CSI framework 500 for dynamic antenna port adaptation that supports techniques for reporting channel quality for dynamic antenna port adaptation in accordance with one or more aspects of the present disclosure. FIG. 5 may be an example of a CSI framework for CSI report configuration such as discussed with reference to FIGS. 1 through 4. For example, FIG. 5 illustrates a CSI framework 500 that may support differential reporting techniques as discussed herein.

In this example, a network entity (e.g., a network entity 105) may provide CSI report configuration information 505 that may include a resource setting 510 that indicates CSI-RS resources 515 (e.g., a 32-port CSI resource). The CSI report configuration information 505 may include codebook configuration 520 that may include multiple codebooks 525, where each codebook is associated with an antenna port configuration e.g., (N1, N2), beam restriction and RI restriction. For example, a first codebook 530 may have (N1, N2) values of (4, 4) and first beam and RI restrictions, a second codebook 535 may have (N1, N2) values of (2, 1) and second beam and RI restrictions, a third codebook 540 may have (N1, N2) values of (2, 2) and third beam and RI restrictions, and a fourth codebook 545 may have (N1, N2) values of (4, 2) and fourth beam and RI restrictions. In some cases, the resource for CSI measurement can be shared among configured codebooks. Based on the configured codebooks 525 and an amount of codebooks to be reported, the UE may transmit a CSI report that contains CSIs associated with codebooks that are to be reported. For example, the UE may compute CSI for each codebook and sort CSIs (e.g., according to spectral efficiency), and then report one or a subset of higher ranked CSIs in the same CSI report. As discussed herein, in some cases one or more CSIs may be reported as differential values from a reference CSI.

Figure 6:
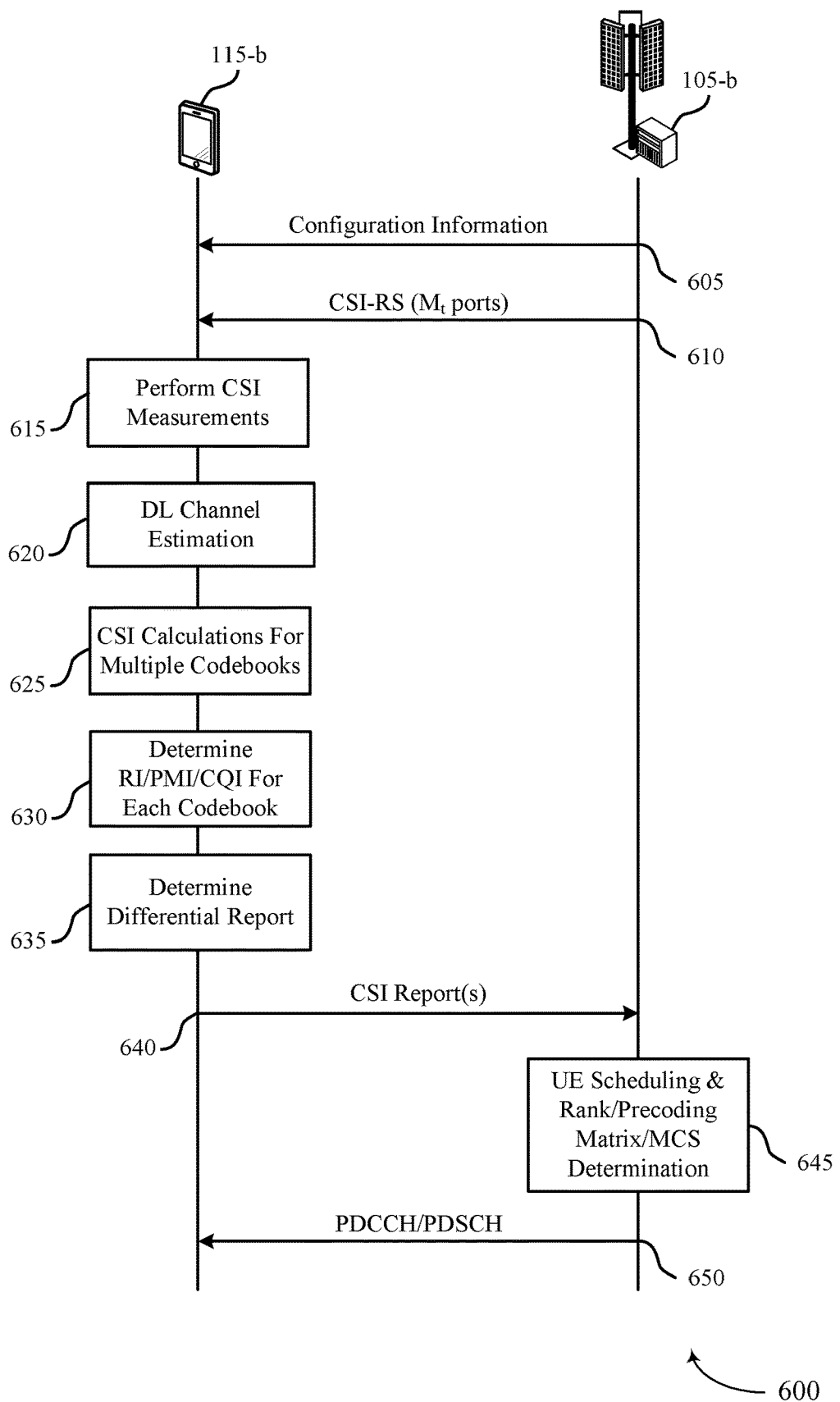
FIG. 6 illustrates an example of a process flow that supports techniques for reporting channel quality for dynamic antenna port adaptation in accordance with one or more aspects of the present disclosure.

FIG. 6 illustrates an example of a process flow 600 that supports techniques for reporting channel quality for dynamic antenna port adaptation in accordance with one or more aspects of the present disclosure. The process flow 600 may include various aspects of the present disclosure described with reference to FIGS. 1 through 5. For example, the process flow 600 may illustrate communications between a UE 115-b and a network entity 105-b, which may be examples of corresponding devices as described with reference to FIGS. 1 and 2. Alternative examples of the following may be implemented, where some steps are performed in a different order than described or are not performed at all. In some cases, a step may include additional features not mentioned below, or further steps may be added.

At 605, the network entity 105-b may transmit, and the UE 115-b may receive, configuration information. In some cases, the configuration information may include a CSI report configuration that may indicate a set of channel state information resources and two or more codebooks for multiple sets of antenna ports associated with the set of channel state information resources. In some cases, the two or more codebooks include at least a first codebook for a first set of antenna ports and a second codebook for a second set of antenna ports that is different than the first set of antenna ports.

At 610, the network entity 105-b may transmit, and the UE 115-b may receive, one or more CSI-RS (e.g., for $M_t$ antenna ports). At 615, the UE 115-b may perform CSI measurements for the CSI-RS transmissions. At 620, the UE 115-b may perform downlink channel estimation based on the CSI measurements. At 625, the UE 115-b perform CSI calculations for multiple codebooks, and at 630 the UE 115-b may determine RI/PMI/CQI for each codebook. In some cases, the CSI calculations and RI/PMI/CQI determinations may be performed by estimating a channel matrix (H) as $M_r \times M_t$, where $M_r$ is the number of receive antenna ports and $M_t$ is the number of transmit antenna ports. The associated codebook from rank-1 to rank-R: may be $$\{\{P_1(0),\ldots,P_1(L_1-1)\},\ldots,\{P_R(0),\ldots,P_R(L_R-1)\}\}.$$

Precoding and rank selection for a given codebook may be determined as $$(R^*,i^*)=\mathrm{argmax}_{r,i}SE_{est}(H,P_r(i))$$

where $SE_{est}(H, P_r(i))$ is the spectral efficiency estimation when H and $P_r(i)$ are given, and top rank is R* and top precoder is $P_{R^*}(C)$. The CQI calculation may be conditioned on the top rank and precoder, as $CQI^*=f(SE_{est}(H, P_{R^*}(i^*)))$.

At 635, the UE 115-*b* may determine one or more differential CSI reports. As discussed herein, in some cases one or more differential CSI reports may be determined, and indicate a difference between a CSI parameters of a first codebook or reference codebook, and a second codebook. In some cases, the differential CSI reports may indicate a supplemental differential CQI that is based on an offset level from corresponding CQI of the first codebook or reference codebook, such as illustrated in Table 1. In such cases, two bits may be used to indicate differential CQI corresponding to an amount of difference from the CQI of the first codebook or reference codebook.

TABLE 1

Differential CQI and Corresponding Offset Level

| Supplemental Differential CQI | Offset level |
|---|---|
| 0 | 0 |
| 1 | 1 |
| 2 | ≥2 |
| 3 | ≤−1 |

At 640, the UE 115-*b* may transmit the CSI reports to the network entity 105-*b*. In some cases, the CSI reports may include a first set of CSI parameters (e.g., CQI) and a set of differential CSI parameters that indicate the difference between corresponding CSI parameters of a second set of CSI parameters and the first set of CSI parameters. At 645, the network entity 105-*b* may perform scheduling and determination of rank, precoding matrix, and MCS for the UE 115-*b*, based on the CSI reports. At 650, the network entity 105-*b* may transmit control channel information and shared channel information (e.g., via physical downlink control channel (PDCCH) and physical downlink shared channel (PDSCH) transmissions) where transmission parameters of the transmissions are based at least in part on the CSI reports. In some cases, the network entity 105-*b* may dynamically change antenna ports for different transmissions, and may indicate corresponding transmission parameters based on the CSI reports.

Figure 7:
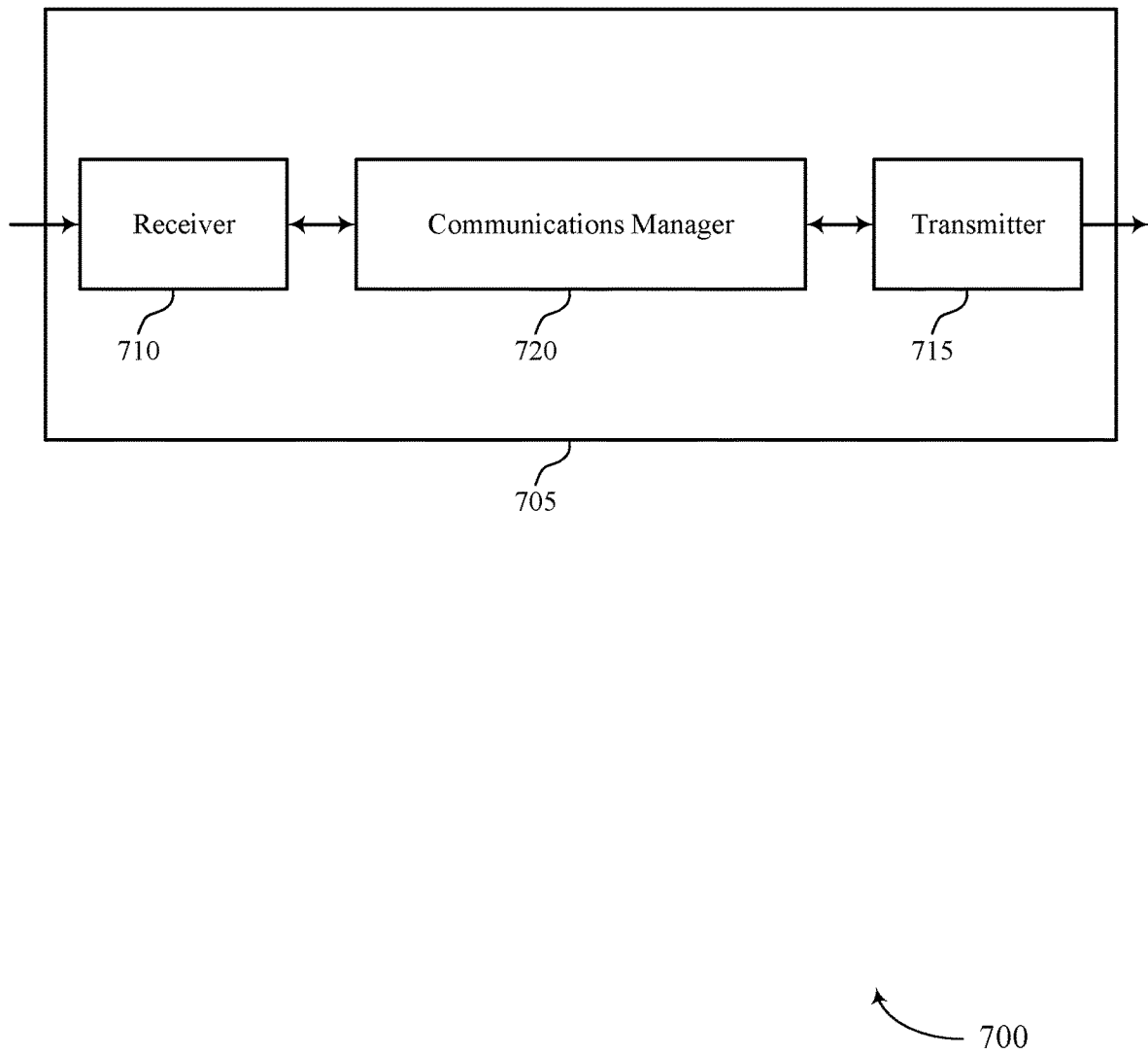
FIGS. 7 and 8 show block diagrams of devices that support techniques for reporting channel quality for dynamic antenna port adaptation in accordance with one or more aspects of the present disclosure.

FIG. 7 shows a block diagram 700 of a device 705 that supports techniques for reporting channel quality for dynamic antenna port adaptation in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for reporting channel quality for dynamic antenna port adaptation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for reporting channel quality for dynamic antenna port adaptation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for reporting channel quality for dynamic antenna port adaptation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The communications manager 720 may be configured as or otherwise support a means for identifying a first set of CSI parameters associated with the first codebook. The communications manager 720 may be configured as or otherwise support a means for identifying a second set of CSI parameters associated with the second codebook. The communications manager 720 may be configured as or otherwise support a means for transmitting a CSI report that includes the first set of CSI parameters and a third set of differential CSI parameters, where the third set of differential CSI parameters indicate a difference between corresponding CSI parameters of the second set of CSI parameters and the first set of CSI parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for differential CSI reporting that provide for reduced overhead associated with reports of multiple sets of CSI parameters, thereby reducing power consumption and enhancing network efficiency, while allowing for dynamic antenna port adaptation for network energy reduction.

Figure 8:
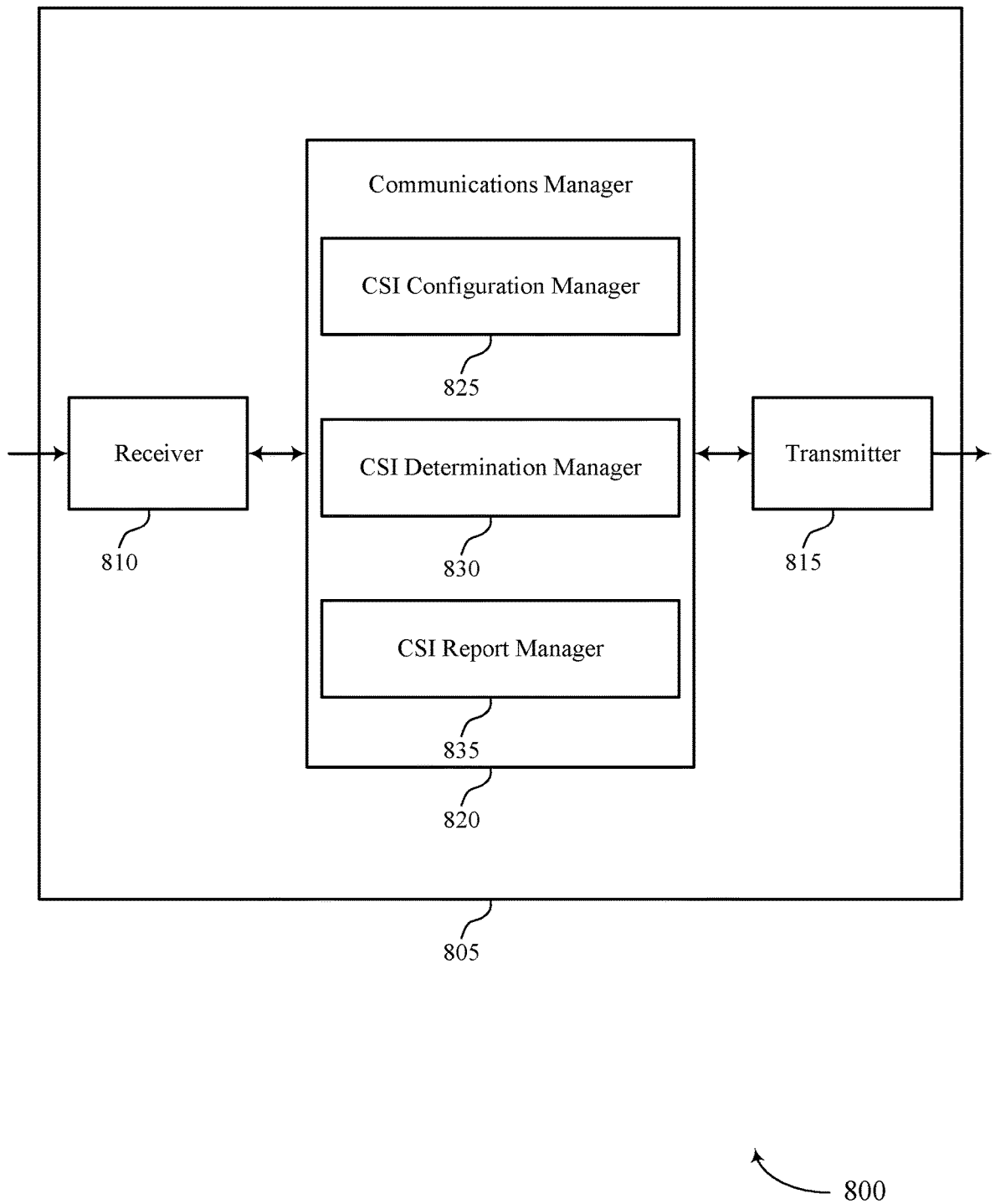

FIG. 8 shows a block diagram 800 of a device 805 that supports techniques for reporting channel quality for dynamic antenna port adaptation in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reporting channel quality for dynamic antenna port adaptation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reporting channel quality for dynamic antenna port adaptation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for reporting channel quality for dynamic antenna port adaptation as described herein. For example, the communications manager 820 may include a CSI configuration manager 825, a CSI determination manager 830, a CSI report manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The CSI configuration manager 825 may be configured as or otherwise support a means for receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The CSI determination manager 830 may be configured as or otherwise support a means for identifying a first set of CSI parameters associated with the first codebook. The CSI determination manager 830 may be configured as or otherwise support a means for identifying a second set of CSI parameters associated with the second codebook. The CSI report manager 835 may be configured as or otherwise support a means for transmitting a CSI report that includes the first set of CSI parameters and a third set of differential CSI parameters, where the third set of differential CSI parameters indicate a difference between corresponding CSI parameters of the second set of CSI parameters and the first set of CSI parameters.

Figure 9:
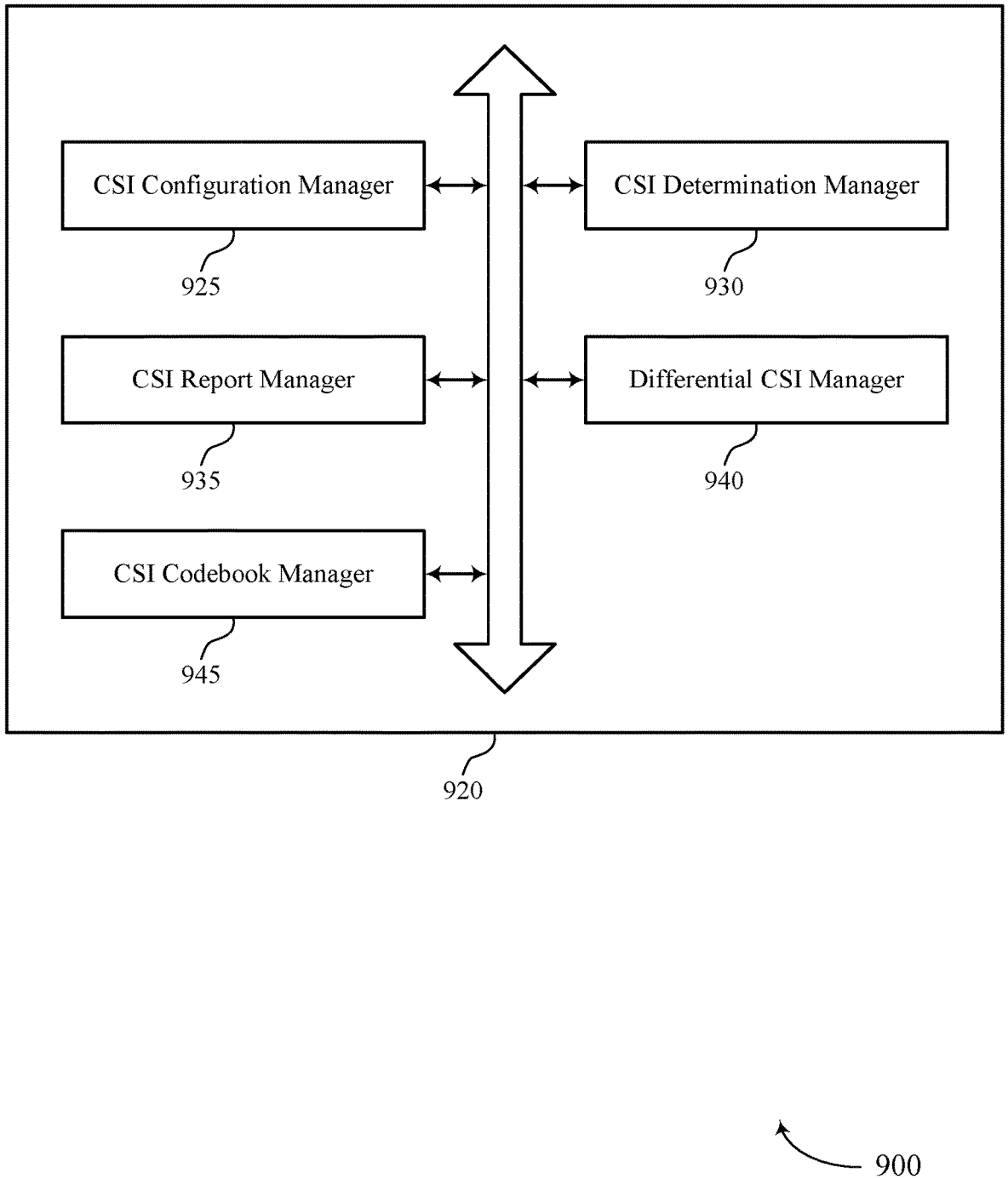
FIG. 9 shows a block diagram of a communications manager that supports techniques for reporting channel quality for dynamic antenna port adaptation in accordance with one or more aspects of the present disclosure.

FIG. 9 shows a block diagram 900 of a communications manager 920 that supports techniques for reporting channel quality for dynamic antenna port adaptation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for reporting channel quality for dynamic antenna port adaptation as described herein. For example, the communications manager 920 may include a CSI configuration manager 925, a CSI determination manager 930, a CSI report manager 935, a differential CSI manager 940, a CSI codebook manager 945, or any combination thereof. Each of these components may communicate, directly or indirectly, with one another (e.g., via one or more buses).

The communications manager 920 may support wireless communication at a UE in accordance with examples as disclosed herein. The CSI configuration manager 925 may be configured as or otherwise support a means for receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The CSI determination manager 930 may be configured as or otherwise support a means for identifying a first set of CSI parameters associated with the first codebook. In some examples, the CSI determination manager 930 may be configured as or otherwise support a means for identifying a second set of CSI parameters associated with the second codebook. The CSI report manager 935 may be configured as or otherwise support a means for transmitting a CSI report that includes the first set of CSI parameters and a third set of differential CSI parameters, where the third set of differential CSI parameters indicate a difference between corresponding CSI parameters of the second set of CSI parameters and the first set of CSI parameters.

In some examples, the differential CSI manager 940 may be configured as or otherwise support a means for determining the third set of differential CSI parameters based on an offset level between index values of a second channel quality indicator (CQI) of the second codebook and a first CQI of the first codebook. In some examples, the offset level indicates a range of a set of ranges of differences between the second CQI and the first CQI. In some examples, the index values of the first CQI and the second CQI indicate CQI values.

In some examples, the CSI codebook manager 945 may be configured as or otherwise support a means for selecting the first codebook from the set of multiple codebooks based on a quantity of antenna ports associated with each codebook of the set of multiple codebooks. In some examples, the CSI codebook manager 945 may be configured as or otherwise support a means for selecting the first codebook from the set of multiple codebooks based on a quantity of columns of antenna ports or a quantity of rows of antenna ports associated with each codebook of the set of multiple codebooks. In some examples, the CSI codebook manager 945 may be configured as or otherwise support a means for selecting the first codebook from the set of multiple codebooks based on an index value associated with a list of the set of multiple sets of antenna ports associated with the set of CSI resources. In some examples, the first codebook corresponds to a base codebook associated with the set of CSI resources, that is indicated in the CSI report configuration. In some examples, the CSI report includes an indication of an index value associated with the first codebook. In some examples, the CSI report configuration further includes an identification of which of the set of multiple codebooks corresponds to the first codebook.

In some examples, the first set of CSI parameters includes a first CQI associated with a first downlink channel codeword and a second CQI associated with a second downlink channel codeword, and where the third set of differential CSI parameters indicate the difference between a third CQI associated with the second set of CSI parameters and one of the first CQI or the second CQI. In some examples, where the third set of differential CSI parameters indicate the difference between the third CQI and the first CQI, and where the second CQI is reported as a differential value from the first CQI.

Figure 10:
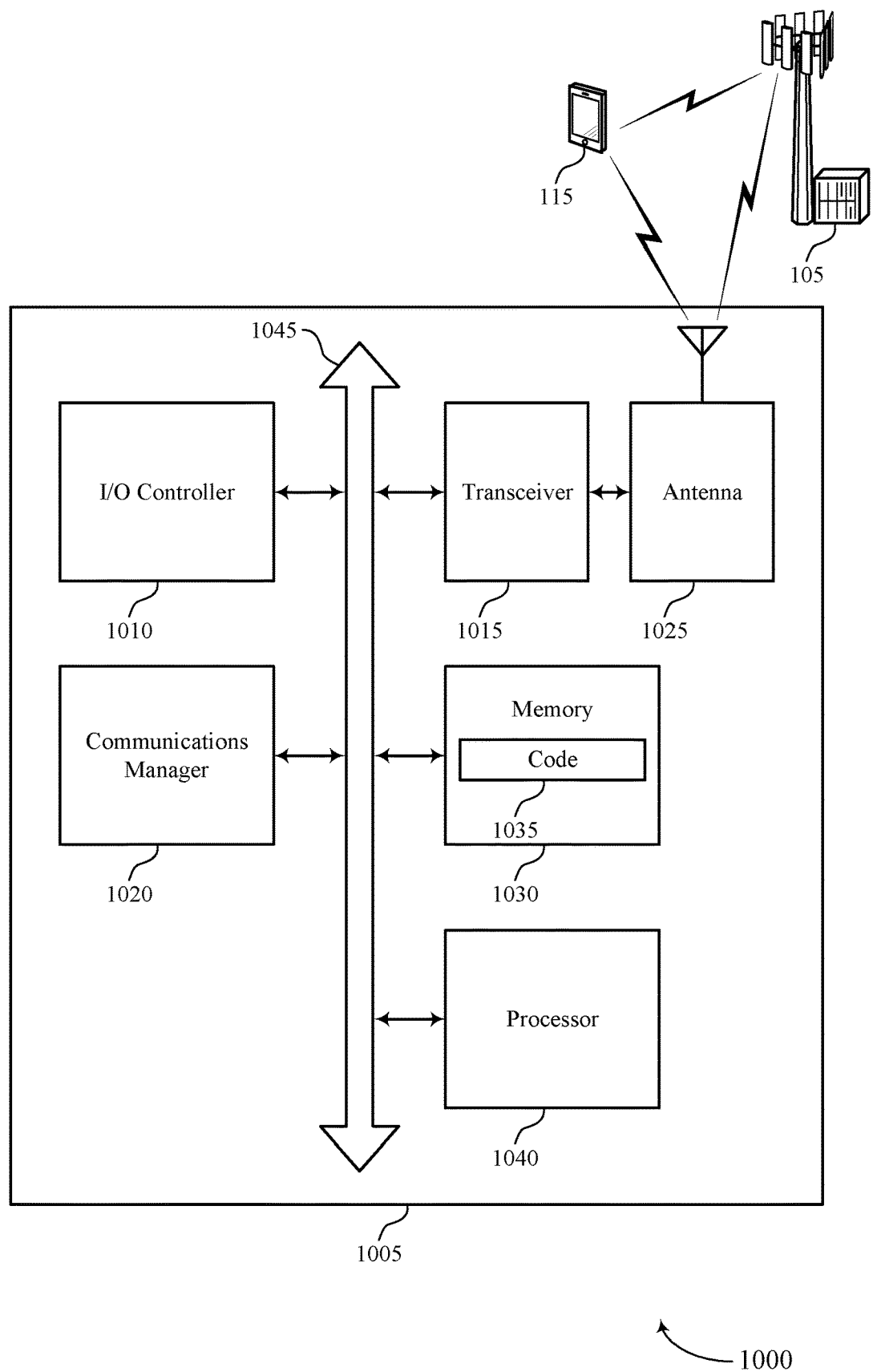
FIG. 10 shows a diagram of a system including a device that supports techniques for reporting channel quality for dynamic antenna port adaptation in accordance with one or more aspects of the present disclosure.

FIG. 10 shows a diagram of a system 1000 including a device 1005 that supports techniques for reporting channel quality for dynamic antenna port adaptation in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for reporting channel quality for dynamic antenna port adaptation). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The communications manager 1020 may be configured as or otherwise support a means for identifying a first set of CSI parameters associated with the first codebook. The communications manager 1020 may be configured as or otherwise support a means for identifying a second set of CSI parameters associated with the second codebook. The communications manager 1020 may be configured as or otherwise support a means for transmitting a CSI report that includes the first set of CSI parameters and a third set of differential CSI parameters, where the third set of differential CSI parameters indicate a difference between corresponding CSI parameters of the second set of CSI parameters and the first set of CSI parameters.

By including or configuring the communications manager 1020 in accordance with examples as described herein, the device 1005 may support techniques for differential CSI reporting that provide for reduced overhead associated with reports of multiple sets of CSI parameters, thereby reducing power consumption and enhancing network efficiency, while allowing for dynamic antenna port adaptation for network energy reduction.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for reporting channel quality for dynamic antenna port adaptation as described herein, or the processor 1040 and the memory 1030 may be otherwise configured to perform or support such operations.

Figure 11:
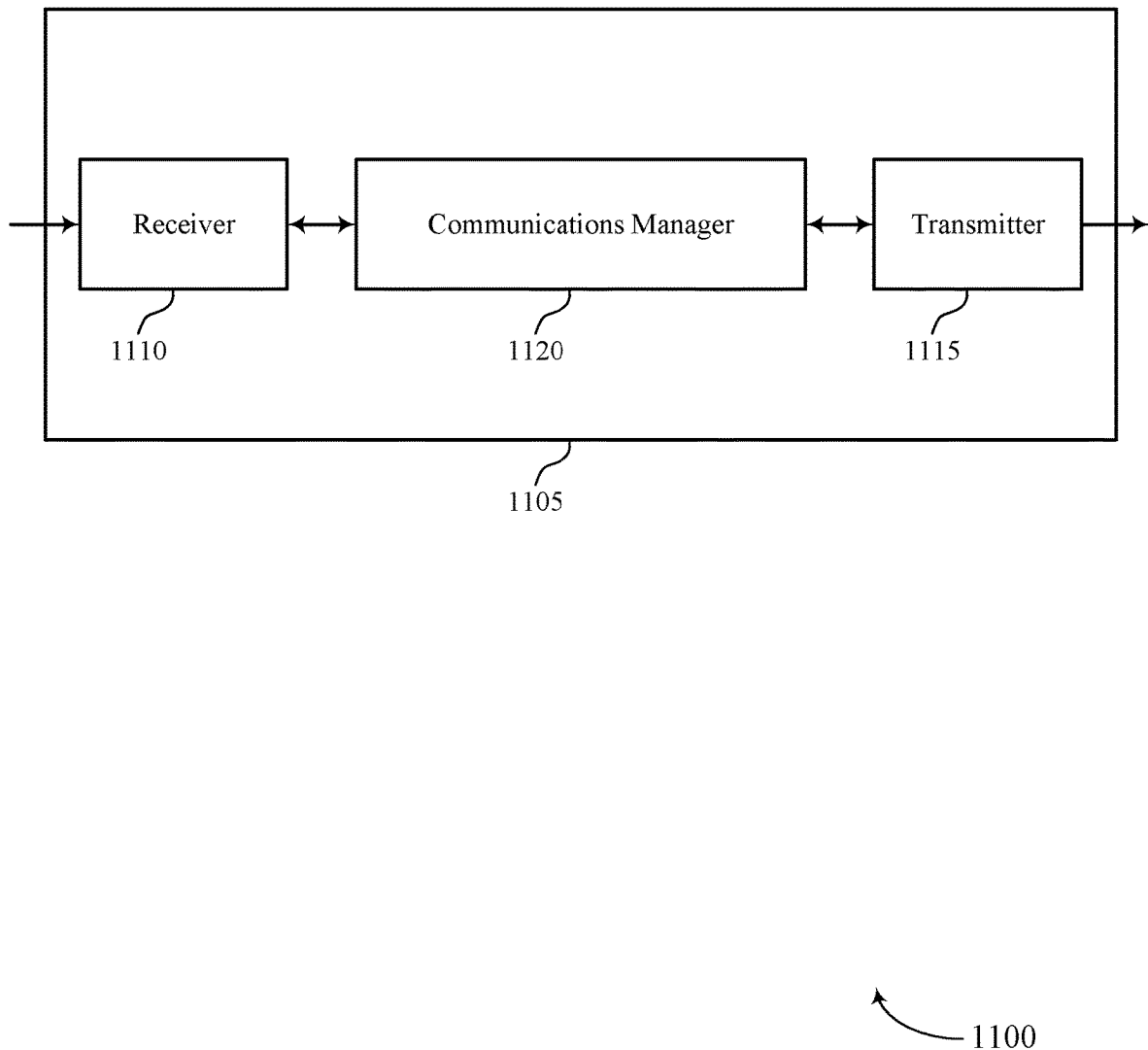
FIGS. 11 and 12 show block diagrams of devices that support techniques for reporting channel quality for dynamic antenna port adaptation in accordance with one or more aspects of the present disclosure.

FIG. 11 shows a block diagram 1100 of a device 1105 that supports techniques for reporting channel quality for dynamic antenna port adaptation in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor 1040. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for reporting channel quality for dynamic antenna port adaptation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The communications manager 1120 may be configured as or otherwise support a means for transmitting one or more reference signals via the set of CSI resources. The communications manager 1120 may be configured as or otherwise support a means for receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for differential CSI reporting that provide for reduced overhead associated with reports of multiple sets of CSI parameters, thereby reducing power consumption and enhancing network efficiency, while allowing for dynamic antenna port adaptation for network energy reduction.

Figure 12:
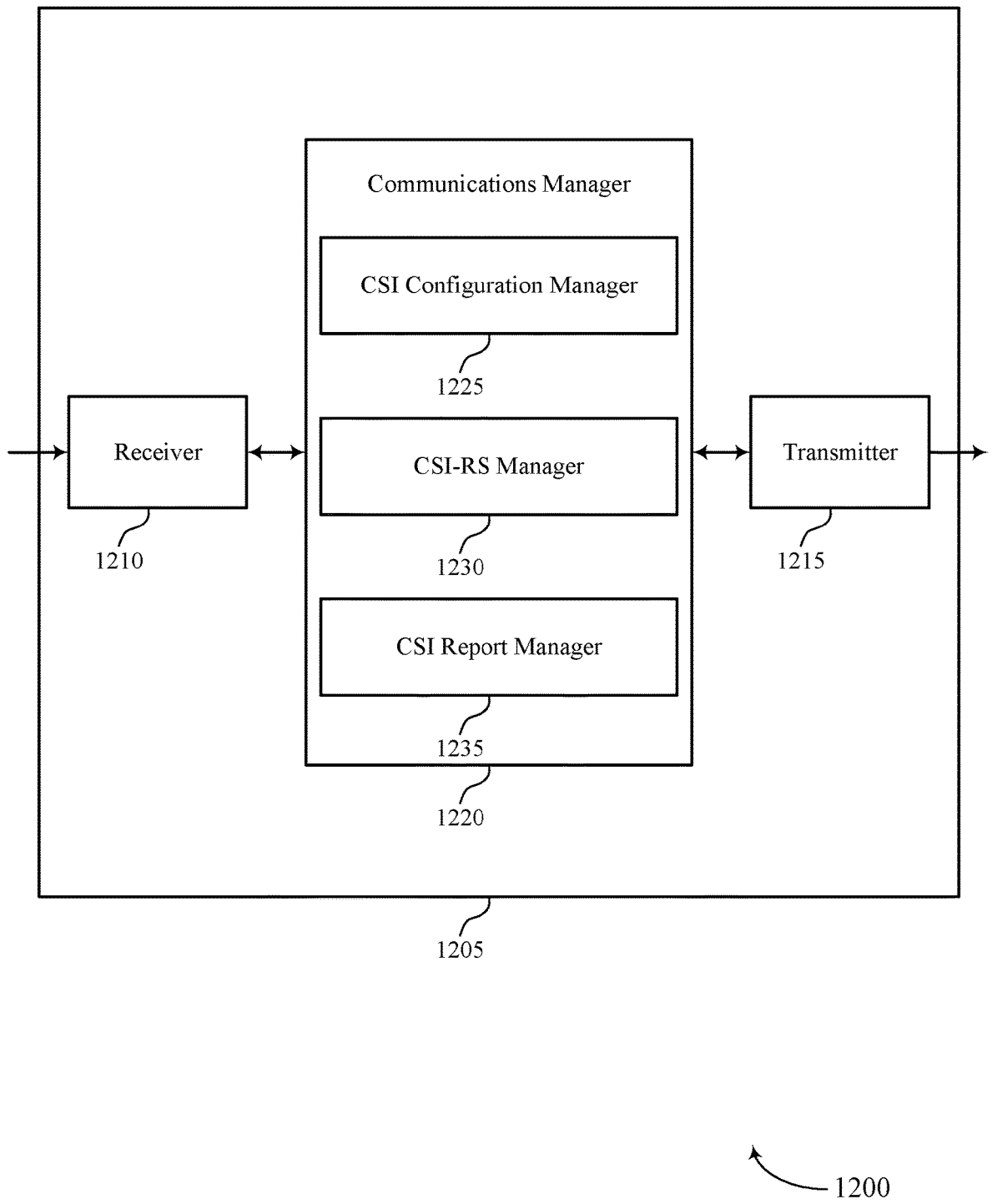

FIG. 12 shows a block diagram 1200 of a device 1205 that supports techniques for reporting channel quality for dynamic antenna port adaptation in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for reporting channel quality for dynamic antenna port adaptation as described herein. For example, the communications manager 1220 may include a CSI configuration manager 1225, a CSI-RS manager 1230, a CSI report manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The CSI configuration manager 1225 may be configured as or otherwise support a means for transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The CSI-RS manager 1230 may be configured as or otherwise support a means for transmitting one or more reference signals via the set of CSI resources. The CSI report manager 1235 may be configured as or otherwise support a means for receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters.

Figure 13:
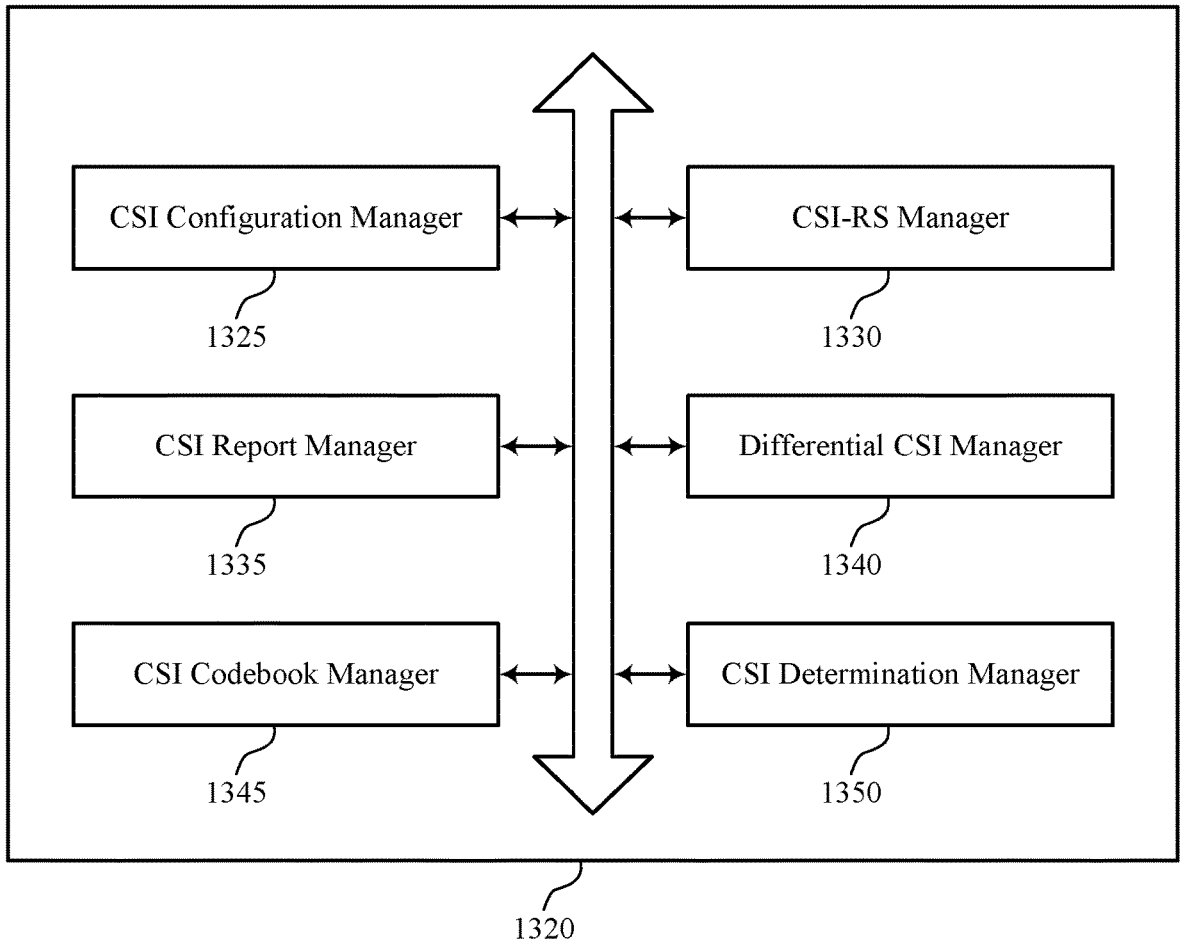
FIG. 13 shows a block diagram of a communications manager that supports techniques for reporting channel quality for dynamic antenna port adaptation in accordance with one or more aspects of the present disclosure.

FIG. 13 shows a block diagram 1300 of a communications manager 1320 that supports techniques for reporting channel quality for dynamic antenna port adaptation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for reporting channel quality for dynamic antenna port adaptation as described herein. For example, the communications manager 1320 may include a CSI configuration manager 1325, a CSI-RS manager 1330, a CSI report manager 1335, a differential CSI manager 1340, a CSI codebook manager 1345, a CSI determination manager 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The CSI configuration manager 1325 may be configured as or otherwise support a means for transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The CSI-RS manager 1330 may be configured as or otherwise support a means for transmitting one or more reference signals via the set of CSI resources. The CSI report manager 1335 may be configured as or otherwise support a means for receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters.

In some examples, the differential CSI manager 1340 may be configured as or otherwise support a means for determining the second set of CSI parameters based on an offset level between index values of a second channel quality indicator (CQI) of the second codebook and a first CQI of the first codebook that is provided in the third set of differential CSI parameters. In some examples, the offset level indicates a range of a set of ranges of differences between the second CQI and the first CQI. In some examples, the index values of the first CQI and the second CQI indicate CQI values.

In some examples, the CSI codebook manager 1345 may be configured as or otherwise support a means for selecting the first codebook from the set of multiple codebooks based on a quantity of antenna ports associated with each codebook of the set of multiple codebooks. In some examples, the CSI codebook manager 1345 may be configured as or otherwise support a means for selecting the first codebook from the set of multiple codebooks based on a quantity of columns of antenna ports or a quantity of rows of antenna ports associated with each codebook of the set of multiple codebooks. In some examples, the CSI codebook manager 1345 may be configured as or otherwise support a means for selecting the first codebook from the set of multiple codebooks based on an index value associated with a list of the set of multiple sets of antenna ports associated with the set of CSI resources. In some examples, the first codebook corresponds to a base codebook associated with the set of CSI resources, that is indicated in the CSI report configuration. In some examples, the CSI report includes an indication of an index value associated with the first codebook. In some examples, the CSI report configuration further includes an identification of which of the set of multiple codebooks corresponds to the first codebook.

In some examples, the first set of CSI parameters includes a first CQI associated with a first downlink channel codeword and a second CQI associated with a second downlink channel codeword, and where the third set of differential CSI parameters indicate the difference between a third CQI associated with the second set of CSI parameters and one of the first CQI or the second CQI. In some examples, where the third set of differential CSI parameters indicate the difference between the third CQI and the first CQI, and where the second CQI is reported as a differential value from the first CQI.

Figure 14:
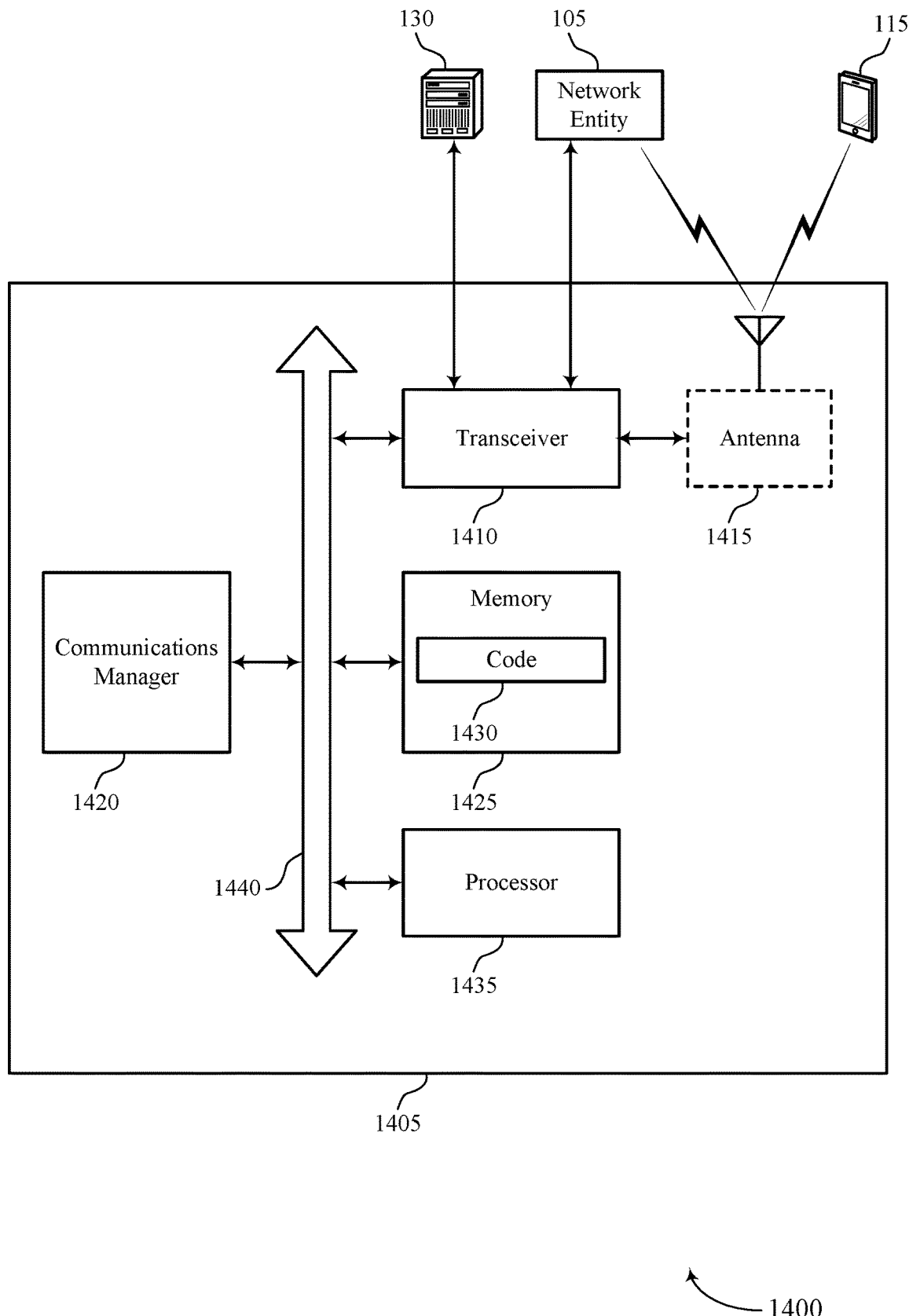
FIG. 14 shows a diagram of a system including a device that supports techniques for reporting channel quality for dynamic antenna port adaptation in accordance with one or more aspects of the present disclosure.

FIG. 14 shows a diagram of a system 1400 including a device 1405 that supports techniques for reporting channel quality for dynamic antenna port adaptation in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for reporting channel quality for dynamic antenna port adaptation). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The communications manager 1420 may be configured as or otherwise support a means for transmitting one or more reference signals via the set of CSI resources. The communications manager 1420 may be configured as or otherwise support a means for receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters.

By including or configuring the communications manager 1420 in accordance with examples as described herein, the device 1405 may support techniques for differential CSI reporting that provide for reduced overhead associated with reports of multiple sets of CSI parameters, thereby reducing power consumption and enhancing network efficiency, while allowing for dynamic antenna port adaptation for network energy reduction.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of techniques for reporting channel quality for dynamic antenna port adaptation as described herein, or the processor 1435 and the memory 1425 may be otherwise configured to perform or support such operations.

Figure 15:
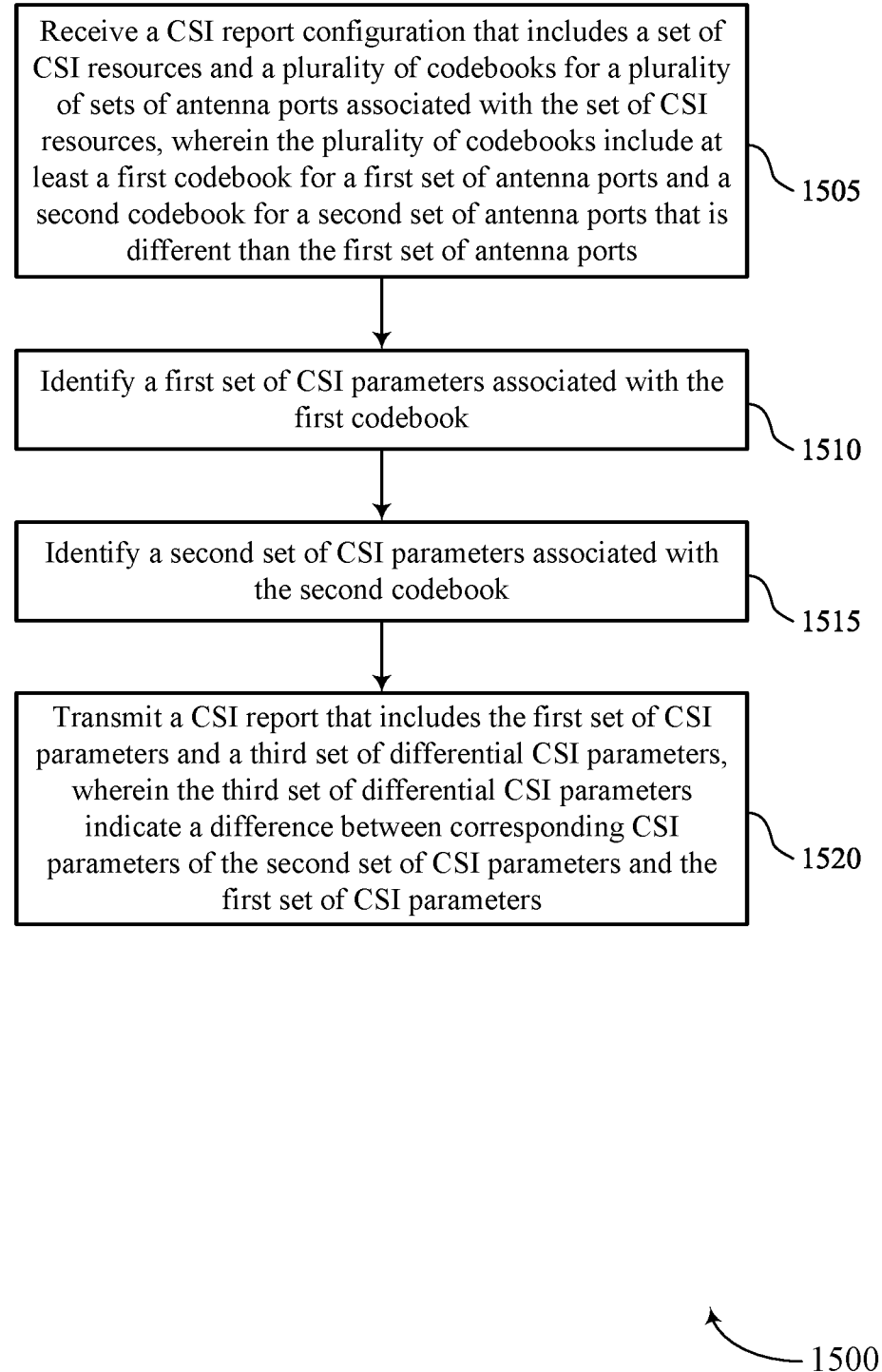
FIGS. 15 through 20 show flowcharts illustrating methods that support techniques for reporting channel quality for dynamic antenna port adaptation in accordance with one or more aspects of the present disclosure.

FIG. 15 shows a flowchart illustrating a method 1500 that supports techniques for reporting channel quality for dynamic antenna port adaptation in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 1505 may be performed in accordance with examples as disclosed herein. In some examples, aspects of the operations of 1505 may be performed by a CSI configuration manager 925 as described with reference to FIG. 9.

At 1510, the method may include identifying a first set of CSI parameters associated with the first codebook. The operations of 1510 may be performed in accordance with examples as disclosed herein. In some examples, aspects of the operations of 1510 may be performed by a CSI determination manager 930 as described with reference to FIG. 9.

At 1515, the method may include identifying a second set of CSI parameters associated with the second codebook. The operations of 1515 may be performed in accordance with examples as disclosed herein. In some examples, aspects of the operations of 1515 may be performed by a CSI determination manager 930 as described with reference to FIG. 9.

At 1520, the method may include transmitting a CSI report that includes the first set of CSI parameters and a third set of differential CSI parameters, where the third set of differential CSI parameters indicate a difference between corresponding CSI parameters of the second set of CSI parameters and the first set of CSI parameters. The operations of 1520 may be performed in accordance with examples as disclosed herein. In some examples, aspects of the operations of 1520 may be performed by a CSI report manager 935 as described with reference to FIG. 9.

Figure 16:
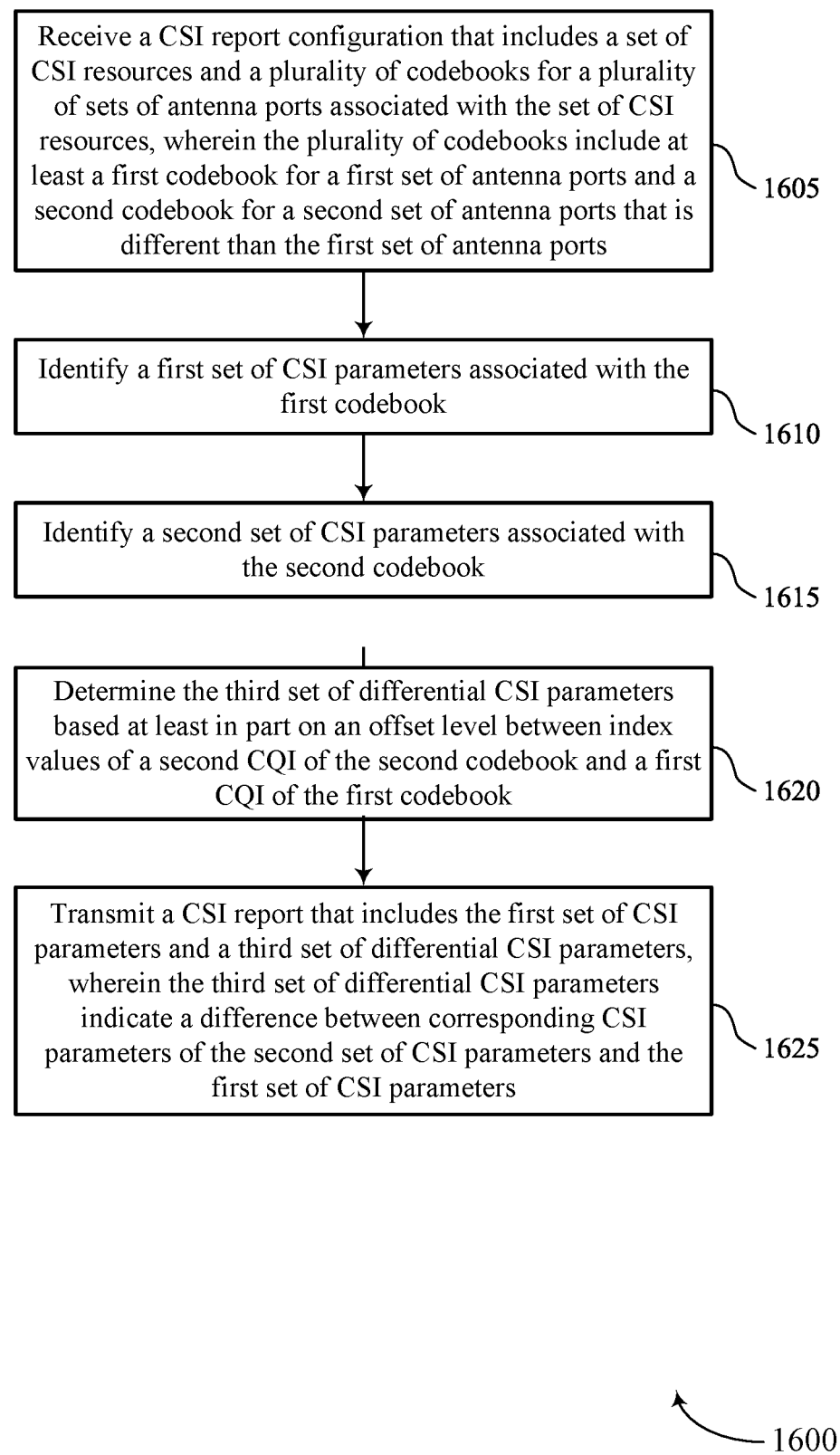

FIG. 16 shows a flowchart illustrating a method 1600 that supports techniques for reporting channel quality for dynamic antenna port adaptation in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 1605 may be performed in accordance with examples as disclosed herein. In some examples, aspects of the operations of 1605 may be performed by a CSI configuration manager 925 as described with reference to FIG. 9.

At 1610, the method may include identifying a first set of CSI parameters associated with the first codebook. The operations of 1610 may be performed in accordance with examples as disclosed herein. In some examples, aspects of the operations of 1610 may be performed by a CSI determination manager 930 as described with reference to FIG. 9.

At 1615, the method may include identifying a second set of CSI parameters associated with the second codebook. The operations of 1615 may be performed in accordance with examples as disclosed herein. In some examples, aspects of the operations of 1615 may be performed by a CSI determination manager 930 as described with reference to FIG. 9.

At 1620, the method may include determining the third set of differential CSI parameters based on an offset level between index values of a second channel quality indicator (CQI) of the second codebook and a first CQI of the first codebook. The operations of 1620 may be performed in accordance with examples as disclosed herein. In some examples, aspects of the operations of 1620 may be performed by a differential CSI manager 940 as described with reference to FIG. 9.

At 1625, the method may include transmitting a CSI report that includes the first set of CSI parameters and a third set of differential CSI parameters, where the third set of differential CSI parameters indicate a difference between corresponding CSI parameters of the second set of CSI parameters and the first set of CSI parameters. The operations of 1625 may be performed in accordance with examples as disclosed herein. In some examples, aspects of the operations of 1625 may be performed by a CSI report manager 935 as described with reference to FIG. 9.

Figure 17:
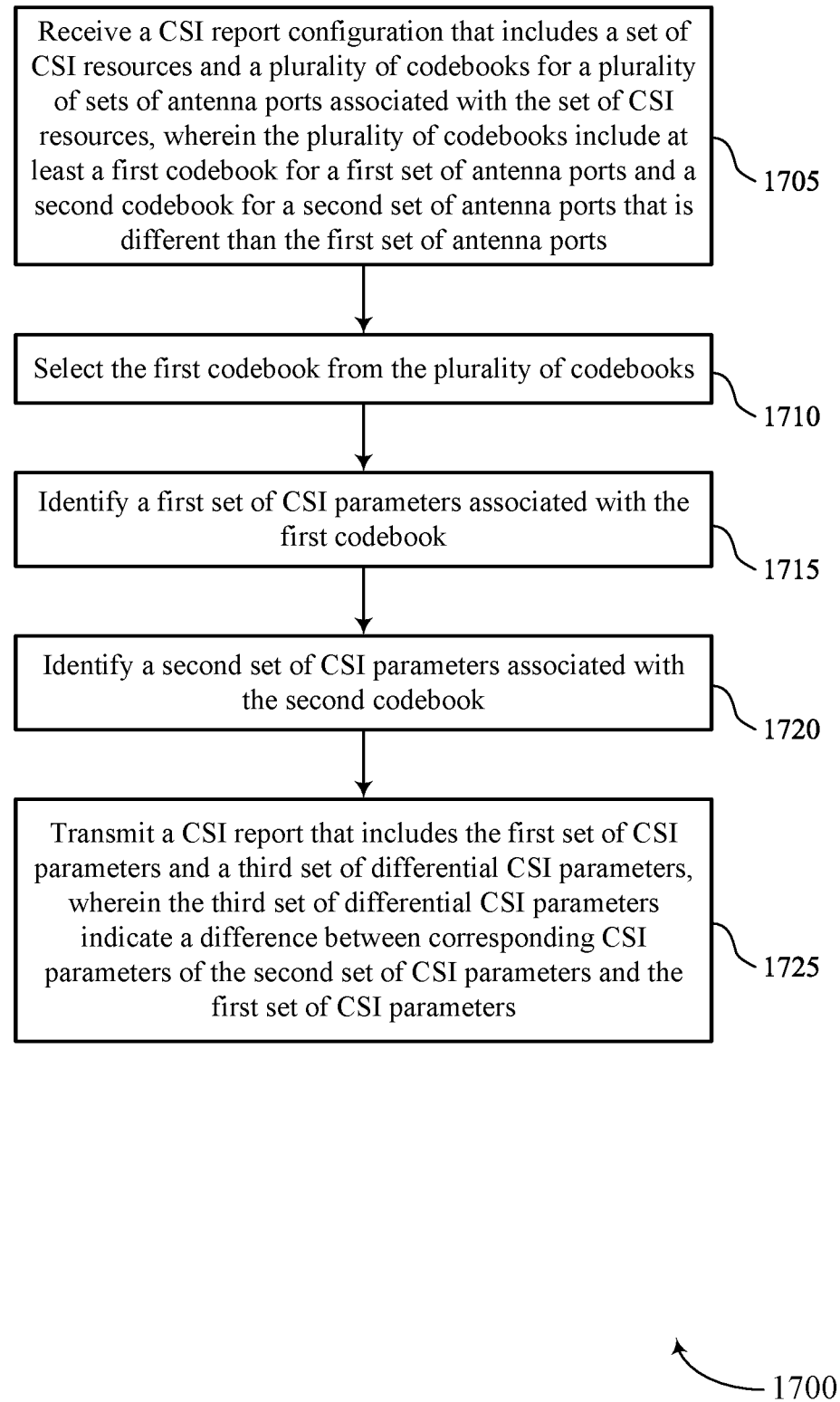

FIG. 17 shows a flowchart illustrating a method 1700 that supports techniques for reporting channel quality for dynamic antenna port adaptation in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 1705 may be performed in accordance with examples as disclosed herein. In some examples, aspects of the operations of 1705 may be performed by a CSI configuration manager 925 as described with reference to FIG. 9.

At 1710, the method may include selecting the first codebook from the set of multiple codebooks based on a quantity of antenna ports associated with each codebook of the set of multiple codebooks. The operations of 1710 may be performed in accordance with examples as disclosed herein. In some examples, aspects of the operations of 1710 may be performed by a CSI codebook manager 945 as described with reference to FIG. 9. In some case, the first codebook may be selected from the set of multiple codebooks based on a quantity of columns of antenna ports or a quantity of rows of antenna ports associated with each codebook of the set of multiple codebooks. In some cases, the first codebook may be selected from the set of multiple codebooks based on an index value associated with a list of the set of multiple sets of antenna ports associated with the set of CSI resources.

At 1715, the method may include identifying a first set of CSI parameters associated with the first codebook. The operations of 1715 may be performed in accordance with examples as disclosed herein. In some examples, aspects of the operations of 1715 may be performed by a CSI determination manager 930 as described with reference to FIG. 9.

At 1720, the method may include identifying a second set of CSI parameters associated with the second codebook. The operations of 1720 may be performed in accordance with examples as disclosed herein. In some examples, aspects of the operations of 1720 may be performed by a CSI determination manager 930 as described with reference to FIG. 9.

At 1725, the method may include transmitting a CSI report that includes the first set of CSI parameters and a third set of differential CSI parameters, where the third set of differential CSI parameters indicate a difference between corresponding CSI parameters of the second set of CSI parameters and the first set of CSI parameters. The operations of 1725 may be performed in accordance with examples as disclosed herein. In some examples, aspects of the operations of 1725 may be performed by a CSI report manager 935 as described with reference to FIG. 9.

Figure 18:
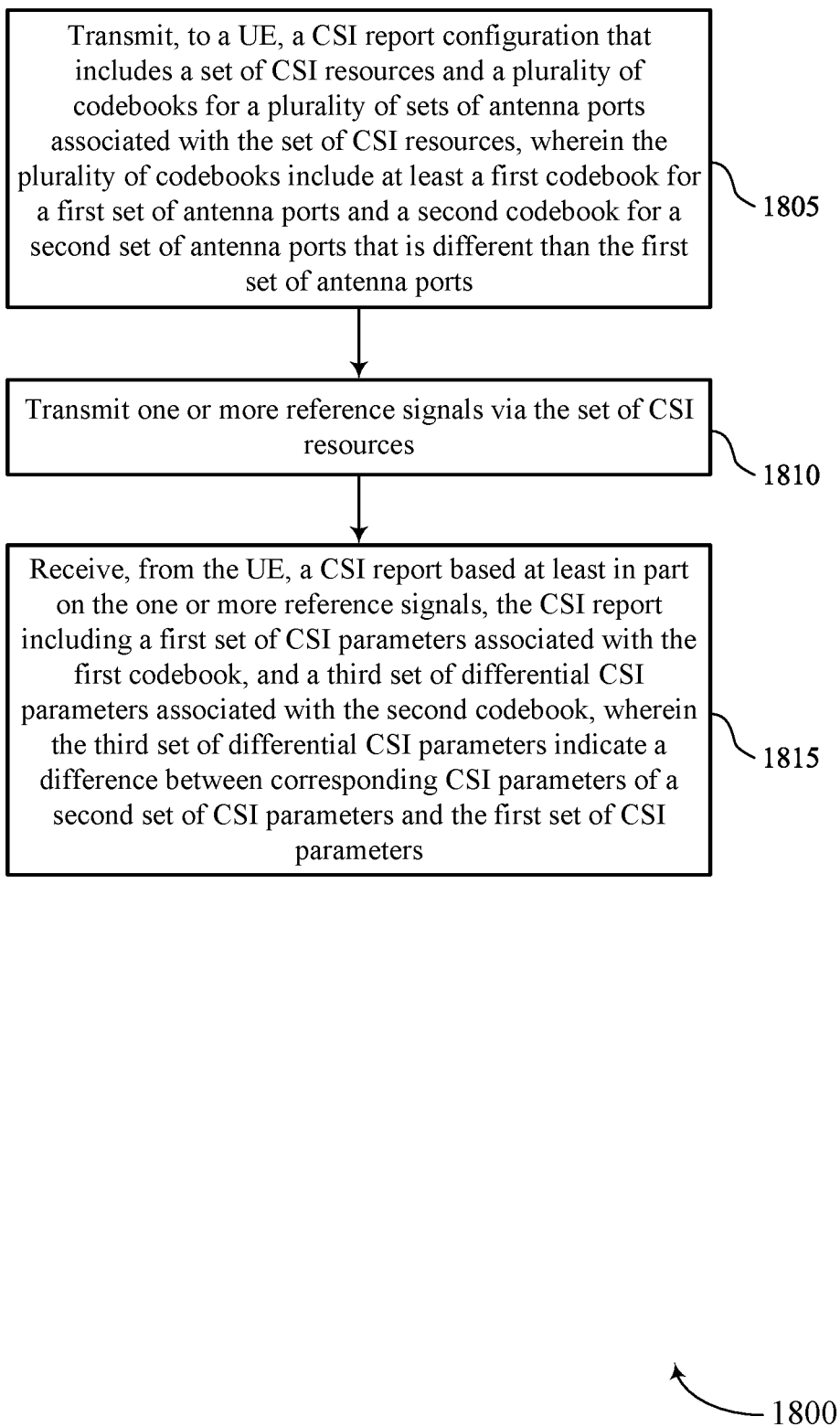

FIG. 18 shows a flowchart illustrating a method 1800 that supports techniques for reporting channel quality for dynamic antenna port adaptation in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 1805 may be performed in accordance with examples as disclosed herein. In some examples, aspects of the operations of 1805 may be performed by a CSI configuration manager 1325 as described with reference to FIG. 13.

At 1810, the method may include transmitting one or more reference signals via the set of CSI resources. The operations of 1810 may be performed in accordance with examples as disclosed herein. In some examples, aspects of the operations of 1810 may be performed by a CSI-RS manager 1330 as described with reference to FIG. 13.

At 1815, the method may include receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters. The operations of 1815 may be performed in accordance with examples as disclosed herein. In some examples, aspects of the operations of 1815 may be performed by a CSI report manager 1335 as described with reference to FIG. 13.

Figure 19:
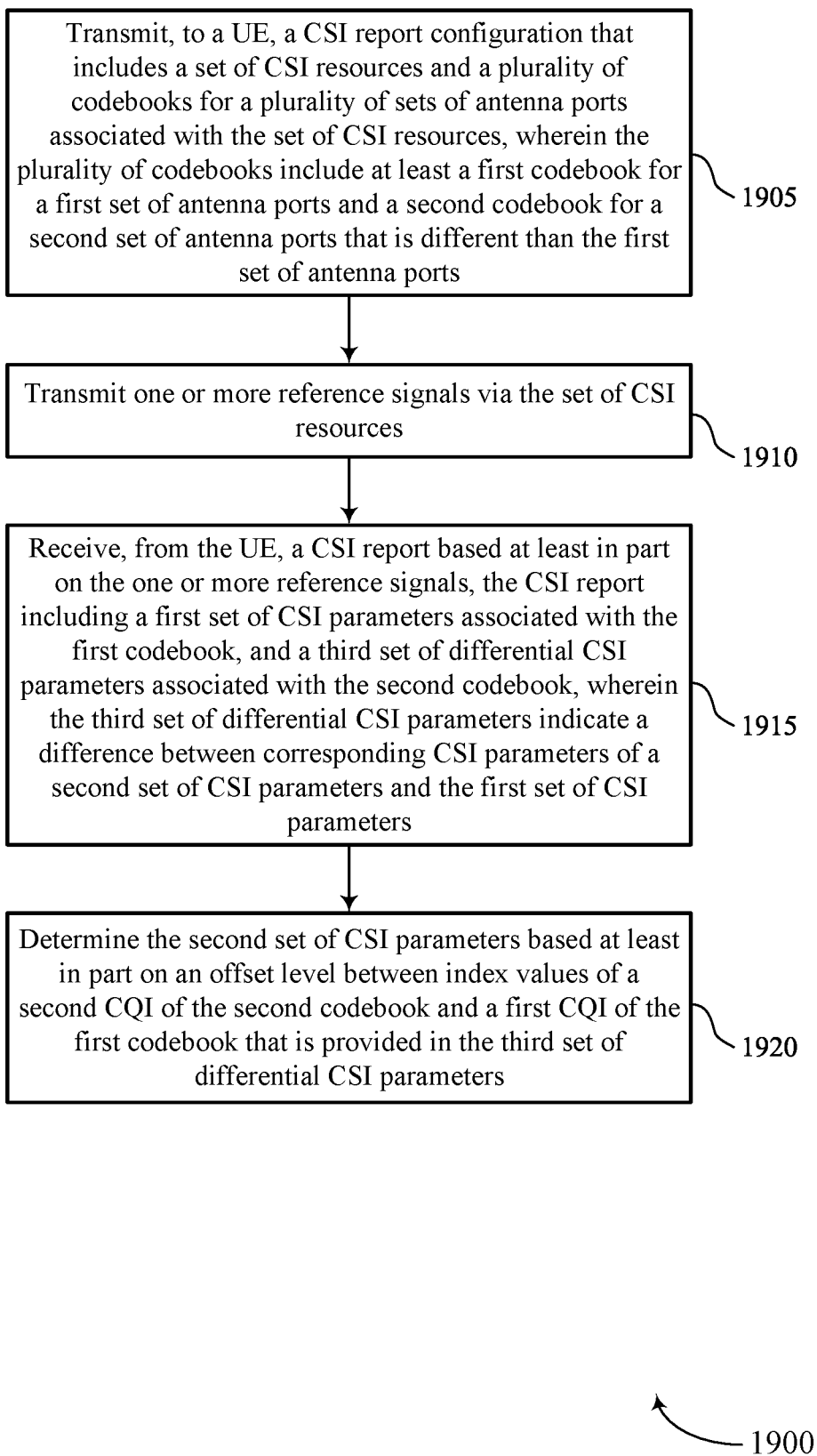

FIG. 19 shows a flowchart illustrating a method 1900 that supports techniques for reporting channel quality for dynamic antenna port adaptation in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 1905 may be performed in accordance with examples as disclosed herein. In some examples, aspects of the operations of 1905 may be performed by a CSI configuration manager 1325 as described with reference to FIG. 13.

At 1910, the method may include transmitting one or more reference signals via the set of CSI resources. The operations of 1910 may be performed in accordance with examples as disclosed herein. In some examples, aspects of the operations of 1910 may be performed by a CSI-RS manager 1330 as described with reference to FIG. 13.

At 1915, the method may include receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters. The operations of 1915 may be performed in accordance with examples as disclosed herein. In some examples, aspects of the operations of 1915 may be performed by a CSI report manager 1335 as described with reference to FIG. 13.

At 1920, the method may include determining the second set of CSI parameters based on an offset level between index values of a second channel quality indicator (CQI) of the second codebook and a first CQI of the first codebook that is provided in the third set of differential CSI parameters. The operations of 1920 may be performed in accordance with examples as disclosed herein. In some examples, aspects of the operations of 1920 may be performed by a differential CSI manager 1340 as described with reference to FIG. 13.

Figure 20:
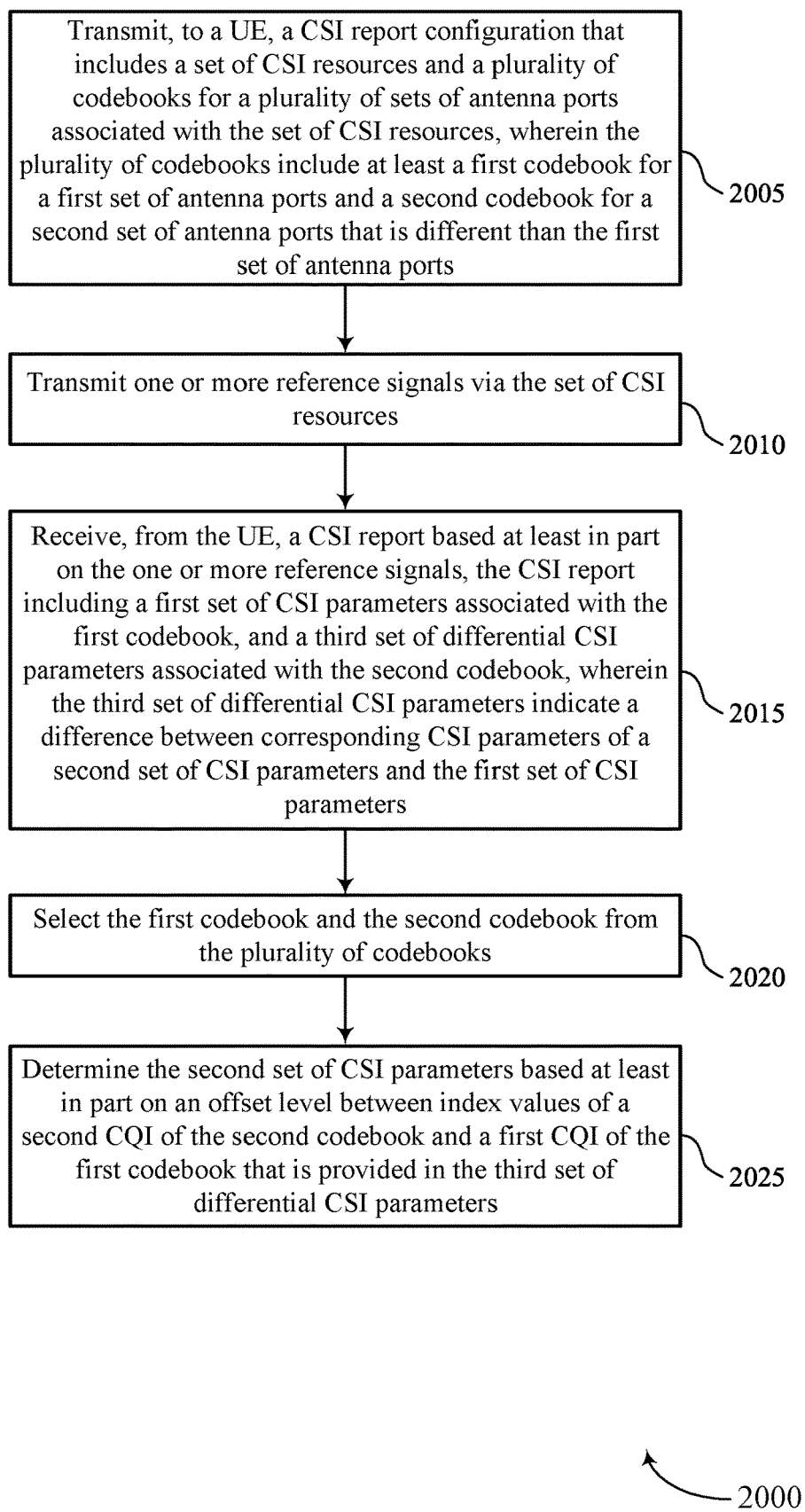

FIG. 20 shows a flowchart illustrating a method 2000 that supports techniques for reporting channel quality for dynamic antenna port adaptation in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, a CSI report configuration that includes a set of CSI resources and a set of multiple codebooks for a set of multiple sets of antenna ports associated with the set of CSI resources, where the set of multiple codebooks include at least a first codebook for a first set of antenna ports and a second codebook for a second set of antenna ports that is different than the first set of antenna ports. The operations of 2005 may be performed in accordance with examples as disclosed herein. In some examples, aspects of the operations of 2005 may be performed by a CSI configuration manager 1325 as described with reference to FIG. 13.

At 2010, the method may include transmitting one or more reference signals via the set of CSI resources. The operations of 2010 may be performed in accordance with examples as disclosed herein. In some examples, aspects of the operations of 2010 may be performed by a CSI-RS manager 1330 as described with reference to FIG. 13.

At 2015, the method may include receiving, from the UE, a CSI report based on the one or more reference signals, the CSI report including a first set of CSI parameters associated with the first codebook, and a third set of differential CSI parameters associated with the second codebook, where the third set of differential CSI parameters indicate a difference between corresponding CSI parameters of a second set of CSI parameters and the first set of CSI parameters. The operations of 2015 may be performed in accordance with examples as disclosed herein. In some examples, aspects of the operations of 2015 may be performed by a CSI report manager 1335 as described with reference to FIG. 13.

At 2020, the method may include selecting the first codebook and the second codebook from the plurality of codebooks. The operations of 2020 may be performed in accordance with examples as disclosed herein. In some examples, aspects of the operations of 2020 may be performed by a CSI codebook manager 1345 as described with reference to FIG. 13.

At 2025, the method may include determining the second set of CSI parameters based at least in part on an offset level between index values of a second CQI of the second codebook and a first CQI of the first codebook that is provided in the third set of differential CSI parameters. The operations of 2025 may be performed in accordance with examples as disclosed herein. In some examples, aspects of the operations of 2025 may be performed by a CSI codebook manager 1345 as described with reference to FIG. 13.

The following provides an overview of aspects of the present disclosure:

Aspect 1: A method for wireless communication at a UE, comprising: receiving a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports; identifying a first set of channel state information parameters associated with the first codebook; identifying a second set of channel state information parameters associated with the second codebook; and transmitting a channel state information report that includes the first set of channel state information parameters and a third set of differential channel state information parameters, wherein the third set of differential channel state information parameters indicate a difference between corresponding channel state information parameters of the second set of channel state information parameters and the first set of channel state information parameters.

Aspect 2: The method of aspect 1, further comprising: determining the third set of differential channel state information parameters based at least in part on an offset level between index values of a second channel quality indicator (CQI) of the second codebook and a first CQI of the first codebook.

Aspect 3: The method of aspect 2, wherein the offset level indicates a range of a set of ranges of differences between the second CQI and the first CQI.

Aspect 4: The method of any of aspects 2 through 3, wherein the index values of the first CQI and the second CQI indicate CQI values.

Aspect 5: The method of any of aspects 1 through 4, further comprising: selecting the first codebook from the plurality of codebooks based at least in part on a quantity of antenna ports associated with each codebook of the plurality of codebooks.

Aspect 6: The method of any of aspects 1 through 5, further comprising: selecting the first codebook from the plurality of codebooks based at least in part on a quantity of columns of antenna ports or a quantity of rows of antenna ports associated with each codebook of the plurality of codebooks.

Aspect 7: The method of any of aspects 1 through 6, further comprising: selecting the first codebook from the plurality of codebooks based at least in part on an index value associated with a list of the plurality of sets of antenna ports associated with the set of channel state information resources.

Aspect 8: The method of any of aspects 1 through 7, wherein the first codebook corresponds to a base codebook associated with the set of channel state information resources, that is indicated in the channel state information report configuration.

Aspect 9: The method of any of aspects 1 through 8, wherein the channel state information report includes an indication of an index value associated with the first codebook.

Aspect 10: The method of any of aspects 1 through 9, wherein the channel state information report configuration further includes an identification of which of the plurality of codebooks corresponds to the first codebook.

Aspect 11: The method of any of aspects 1 through 10, wherein the first set of channel state information parameters includes a first CQI associated with a first downlink channel codeword and a second CQI associated with a second downlink channel codeword, and wherein the third set of differential channel state information parameters indicate the difference between a third CQI associated with the second set of channel state information parameters and one of the first CQI or the second CQI.

Aspect 12: The method of aspect 11, wherein the third set of differential channel state information parameters indicate the difference between the third CQI and the first CQI, and wherein the second CQI is reported as a differential value from the first CQI.

Aspect 13: A method for wireless communication at a network entity, comprising: transmitting, to a UE, a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports; transmitting one or more reference signals via the set of channel state information resources; and receiving, from the UE, a channel state information report based at least in part on the one or more reference signals, the channel state information report including a first set of channel state information parameters associated with the first codebook, and a third set of differential channel state information parameters associated with the second codebook, wherein the third set of differential channel state information parameters indicate a difference between corresponding channel state information parameters of a second set of channel state information parameters and the first set of channel state information parameters.

Aspect 14: The method of aspect 13, further comprising: determining the second set of channel state information parameters based at least in part on an offset level between index values of a second channel quality indicator (CQI) of the second codebook and a first CQI of the first codebook that is provided in the third set of differential channel state information parameters.

Aspect 15: The method of aspect 14, wherein the offset level indicates a range of a set of ranges of differences between the second CQI and the first CQI.

Aspect 16: The method of any of aspects 14 through 15, wherein the index values of the first CQI and the second CQI indicate CQI values.

Aspect 17: The method of any of aspects 13 through 16, further comprising: selecting the first codebook from the plurality of codebooks based at least in part on a quantity of antenna ports associated with each codebook of the plurality of codebooks.

Aspect 18: The method of any of aspects 13 through 17, further comprising: selecting the first codebook from the plurality of codebooks based at least in part on a quantity of columns of antenna ports or a quantity of rows of antenna ports associated with each codebook of the plurality of codebooks.

Aspect 19: The method of any of aspects 13 through 18, further comprising: selecting the first codebook from the plurality of codebooks based at least in part on an index value associated with a list of the plurality of sets of antenna ports associated with the set of channel state information resources.

Aspect 20: The method of any of aspects 13 through 19, wherein the first codebook corresponds to a base codebook associated with the set of channel state information resources, that is indicated in the channel state information report configuration.

Aspect 21: The method of any of aspects 13 through 20, wherein the channel state information report includes an indication of an index value associated with the first codebook.

Aspect 22: The method of any of aspects 13 through 21, wherein the channel state information report configuration further includes an identification of which of the plurality of codebooks corresponds to the first codebook.

Aspect 23: The method of any of aspects 13 through 22, wherein the first set of channel state information parameters includes a first CQI associated with a first downlink channel codeword and a second CQI associated with a second downlink channel codeword, and wherein the third set of differential channel state information parameters indicate the difference between a third CQI associated with the second set of channel state information parameters and one of the first CQI or the second CQI.

Aspect 24: The method of aspect 23, wherein the third set of differential channel state information parameters indicate the difference between the third CQI and the first CQI, and wherein the second CQI is reported as a differential value from the first CQI.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports;
   identifying a first set of channel state information parameters associated with the first codebook;
   identifying a second set of channel state information parameters associated with the second codebook; and
   transmitting a channel state information report that includes the first set of channel state information parameters and a third set of differential channel state information parameters, wherein the third set of differential channel state information parameters indicate a difference between corresponding channel state information parameters of the second set of channel state information parameters and the first set of channel state information parameters.

2. The method of claim 1, further comprising:
   determining the third set of differential channel state information parameters based at least in part on an offset level between index values of a second channel quality indicator (CQI) of the second codebook and a first CQI of the first codebook.

3. The method of claim 2, wherein the offset level indicates a range of a set of ranges of differences between the second CQI and the first CQI.

4. The method of claim 2, wherein the index values of the first CQI and the second CQI indicate CQI values.

5. The method of claim 1, further comprising:
   selecting the first codebook from the plurality of codebooks based at least in part on a quantity of antenna ports associated with each codebook of the plurality of codebooks.

6. The method of claim 1, further comprising:
   selecting the first codebook from the plurality of codebooks based at least in part on a quantity of columns of antenna ports or a quantity of rows of antenna ports associated with each codebook of the plurality of codebooks.

7. The method of claim 1, further comprising:
   selecting the first codebook from the plurality of codebooks based at least in part on an index value associated with a list of the plurality of sets of antenna ports associated with the set of channel state information resources.

8. The method of claim 1, wherein the first codebook corresponds to a base codebook associated with the set of channel state information resources, that is indicated in the channel state information report configuration.

9. The method of claim 1, wherein the channel state information report includes an indication of an index value associated with the first codebook.

10. The method of claim 1, wherein the channel state information report configuration further includes an identification of which of the plurality of codebooks corresponds to the first codebook.

11. The method of claim 1, wherein the first set of channel state information parameters includes a first channel quality indicator (CQI) associated with a first downlink channel codeword and a second CQI associated with a second downlink channel codeword, and wherein the third set of differential channel state information parameters indicate the difference between a third CQI associated with the second set of channel state information parameters and one of the first CQI or the second CQI.

12. The method of claim 11, wherein the third set of differential channel state information parameters indicate the difference between the third CQI and the first CQI, and wherein the second CQI is reported as a differential value from the first CQI.

13. A method for wireless communication at a network entity, comprising:
   transmitting, to a user equipment (UE), a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports;
   transmitting one or more reference signals via the set of channel state information resources; and
   receiving, from the UE, a channel state information report based at least in part on the one or more reference signals, the channel state information report including a first set of channel state information parameters associated with the first codebook, and a third set of differential channel state information parameters associated with the second codebook, wherein the third set of differential channel state information parameters indicate a difference between corresponding channel state information parameters of a second set of channel state information parameters and the first set of channel state information parameters.

14. The method of claim 13, further comprising:
   determining the second set of channel state information parameters based at least in part on an offset level between index values of a second channel quality indicator (CQI) of the second codebook and a first CQI of the first codebook that is provided in the third set of differential channel state information parameters.

15. The method of claim 14, wherein the offset level indicates a range of a set of ranges of differences between the second CQI and the first CQI.

16. The method of claim 14, wherein the index values of the first CQI and the second CQI indicate CQI values.

17. The method of claim 13, further comprising:
   selecting the first codebook from the plurality of codebooks based at least in part on a quantity of antenna ports associated with each codebook of the plurality of codebooks.

18. The method of claim 13, further comprising:
selecting the first codebook from the plurality of codebooks based at least in part on a quantity of columns of antenna ports or a quantity of rows of antenna ports associated with each codebook of the plurality of codebooks.

19. The method of claim 13, further comprising:
selecting the first codebook from the plurality of codebooks based at least in part on an index value associated with a list of the plurality of sets of antenna ports associated with the set of channel state information resources.

20. The method of claim 13, wherein the first codebook corresponds to a base codebook associated with the set of channel state information resources, that is indicated in the channel state information report configuration.

21. The method of claim 13, wherein the channel state information report includes an indication of an index value associated with the first codebook.

22. The method of claim 13, wherein the channel state information report configuration further includes an identification of which of the plurality of codebooks corresponds to the first codebook.

23. The method of claim 13, wherein the first set of channel state information parameters includes a first channel quality indicator (CQI) associated with a first downlink channel codeword and a second CQI associated with a second downlink channel codeword, and wherein the third set of differential channel state information parameters indicate the difference between a third CQI associated with the second set of channel state information parameters and one of the first CQI or the second CQI.

24. The method of claim 23, wherein the third set of differential channel state information parameters indicate the difference between the third CQI and the first CQI, and wherein the second CQI is reported as a differential value from the first CQI.

25. An apparatus for wireless communication at a user equipment (UE), comprising:
a processor;
memory coupled with the processor; and
instructions stored in the memory and executable by the processor to cause the apparatus to:
receive a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports;
identify a first set of channel state information parameters associated with the first codebook;
identify a second set of channel state information parameters associated with the second codebook; and
transmit a channel state information report that includes the first set of channel state information parameters and a third set of differential channel state information parameters, wherein the third set of differential channel state information parameters indicate a difference between corresponding channel state information parameters of the second set of channel state information parameters and the first set of channel state information parameters.

26. The apparatus of claim 25, wherein the instructions are further executable by the processor to cause the apparatus to:
determine the third set of differential channel state information parameters based at least in part on an offset level between index values of a second channel quality indicator (CQI) of the second codebook and a first CQI of the first codebook.

27. The apparatus of claim 25, wherein the instructions are further executable by the processor to cause the apparatus to:
select the first codebook from the plurality of codebooks based at least in part on a quantity of antenna ports associated with each codebook of the plurality of codebooks.

28. An apparatus for wireless communication at a network entity, comprising:
a processor;
memory coupled with the processor; and
instructions stored in the memory and executable by the processor to cause the apparatus to:
transmit, to a user equipment (UE), a channel state information report configuration that includes a set of channel state information resources and a plurality of codebooks for a plurality of sets of antenna ports associated with the set of channel state information resources, wherein the plurality of codebooks include at least a first codebook for a first set of antenna ports and a second codebook for a second set of antenna ports that is different than the first set of antenna ports;
transmit one or more reference signals via the set of channel state information resources; and
receive, from the UE, a channel state information report based at least in part on the one or more reference signals, the channel state information report including a first set of channel state information parameters associated with the first codebook, and a third set of differential channel state information parameters associated with the second codebook, wherein the third set of differential channel state information parameters indicate a difference between corresponding channel state information parameters of a second set of channel state information parameters and the first set of channel state information parameters.

29. The apparatus of claim 28, wherein the instructions are further executable by the processor to cause the apparatus to:
determine the second set of channel state information parameters based at least in part on an offset level between index values of a second channel quality indicator (CQI) of the second codebook and a first CQI of the first codebook that is provided in the third set of differential channel state information parameters.

30. The apparatus of claim 28, wherein the instructions are further executable by the processor to cause the apparatus to:
select the first codebook from the plurality of codebooks based at least in part on a quantity of antenna ports associated with each codebook of the plurality of codebooks.

* * * * *